(12) United States Patent
Jing et al.

(10) Patent No.: US 11,558,269 B2
(45) Date of Patent: Jan. 17, 2023

(54) METHOD, DEVICE, AND SYSTEM FOR NETWORK TRAFFIC ANALYSIS

(71) Applicant: Nokia Solutions and Networks Oy, Espoo (FI)

(72) Inventors: Xuyang Jing, Xi'an (CN); Zheng Yan, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/262,522

(22) PCT Filed: Jul. 27, 2018

(86) PCT No.: PCT/CN2018/097300
§ 371 (c)(1),
(2) Date: Jan. 22, 2021

(87) PCT Pub. No.: WO2020/019270
PCT Pub. Date: Jan. 30, 2020

(65) Prior Publication Data
US 2021/0273865 A1    Sep. 2, 2021

(51) Int. Cl.
*G06F 15/173* (2006.01)
*H04L 43/062* (2022.01)
(Continued)

(52) U.S. Cl.
CPC ............ *H04L 43/062* (2013.01); *H04L 43/10* (2013.01); *H04L 43/18* (2013.01); *H04L 63/0245* (2013.01); *H04L 63/1425* (2013.01)

(58) Field of Classification Search
None
See application file for complete search history.

(56) References Cited

U.S. PATENT DOCUMENTS

| 5,652,840 A | * | 7/1997 | Okamoto | ................ | H04L 12/28 340/9.15 |
| 9,473,178 B2 | | 10/2016 | Shastry et al. | | |

(Continued)

FOREIGN PATENT DOCUMENTS

| CN | 101616129 A | 12/2009 |
| CN | 106657038 A | 5/2017 |

(Continued)

OTHER PUBLICATIONS

Boro et al., "UDP Flooding Attack Detection Using Information Metric Measure", Proceedings of International Conference on ICT for Sustainable Development, 2016, pp. 143-153.

(Continued)

*Primary Examiner* — Phuoc H Nguyen
(74) *Attorney, Agent, or Firm* — Fay Sharpe LLP

(57) ABSTRACT

A method, device, and system for network traffic analysis are provided. The method comprises obtaining traffic data of current time interval, recording the traffic data in a Chinese Remainder Theorem based Reversible Sketch (CRT-RS) based on a hash operation comprising Modulo operations, detecting abnormal buckets in the CRT-RS based on a change between the traffic data of current time interval and traffic data of previous time interval, and recovering abnormal source address associated information based on the abnormal buckets, wherein the modulus of the Modulo operations are selected from the modulus in Chinese Remainder Theorem (CRT) as pairwise coprime integers and the CRT-RS includes a plurality of buckets. The step of detecting uses a Modified Multi-chart Cumulative Sum.

19 Claims, 8 Drawing Sheets

(51) Int. Cl.
*H04L 43/10* (2022.01)
*H04L 43/18* (2022.01)
*H04L 9/40* (2022.01)

(56) References Cited

U.S. PATENT DOCUMENTS

| | | | |
|---|---|---|---|
| 2006/0075489 A1 | 4/2006 | Ganguly et al. | |
| 2006/0291661 A1* | 12/2006 | Ramzan | H04L 9/0844 380/277 |
| 2007/0245119 A1* | 10/2007 | Hoppe | H04L 45/7453 711/216 |
| 2009/0178140 A1* | 7/2009 | Cao | H04L 63/1416 726/23 |
| 2014/0193076 A1* | 7/2014 | Gardiner | G06T 9/00 382/190 |
| 2016/0134593 A1* | 5/2016 | Gvili | H04L 63/0442 713/170 |
| 2016/0203382 A1* | 7/2016 | Gardiner | G06K 9/46 382/190 |
| 2019/0036678 A1* | 1/2019 | Ahmed | H04L 9/302 |

FOREIGN PATENT DOCUMENTS

| | | |
|---|---|---|
| CN | 104539594 B | 2/2018 |
| KR | 10-2011-0049311 A | 5/2011 |

OTHER PUBLICATIONS

Zhou et al., "DDoS Attack Detection using Packet Size Interval", 11th International Conference on Wireless Communications, Networking and Mobile Computing (WiCOM 2015), Sep. 21-23, 2015, 7 pages.

Xiao et al., "Detecting DDoS Attacks against Data Center with Correlation Analysis", Computer Communications, vol. 67, 2015, pp. 1-25.

Sun et al., "SACK2: Effective SYN Flood Detection against Skillful Spoofs", IET Information Security, vol. 6, No. 3, 2012, pp. 149-156.

Wei et al., "A Rank Correlation Based Detection against Distributed Reflection DoS Attacks", IEEE Communications Letters, vol. 17, No. 1, Jan. 2013, pp. 173-175.

Meitei et al., "Detection of DDoS DNS Amplification Attack Using Classification Algorithm", Proceedings of International Conference on Informatics and Analytics, 2016, 6 pages.

Cai et al., "A Behavior-Based Method for Detecting DNS Amplification Attacks", 10th International Conference on Innovative Mobile and Internet Services in Ubiquitous Computing (IMIS), Jul. 6-8, 2016, 608-613.

Liaskos et al., "A Novel Framework for Modeling and Mitigating Distributed Link Flooding Attacks", The 35th Annual IEEE International Conference on Computer Communications, Apr. 10-14, 2016, 9 pages.

Lee et al., "CoDef: Collaborative Defense Against Large-Scale Link-Flooding Attacks", Proceedings of the ninth ACM conference on Emerging networking experiments and technologies, Dec. 2013, pp. 417-427.

Adiga et al., "A Reversible Sketch Based on Chinese Remainder Theorem: Scheme and Performance Study", IJCSNS International Journal of Computer Science and Network Security, vol. 11, No. 8, Aug. 2011, pp. 59-65.

Bhagat et al., "Fusion of Detection, Traffic Control and Traceback Technique for Ddos Attacks r", International Journal of Recent Trends in Engineering, vol. 1, No. 1, May 2009, pp. 643-646.

Wang et al., "A Data Streaming Method for Monitoring Host Connection Degrees of High-speed Links", IEEE Transactions on Information Forensics and Security, vol. 6, No. 3, Sep. 2011, pp. 1086-1098.

Wang et al., "Change-Point Monitoring for the Detection of Dos Attacks", IEEE Transactions on Dependable and Secure Computing, vol. 1, No. 4, Oct.-Dec. 2004, pp. 193-208.

International Search Report and Written Opinion received for corresponding Patent Cooperation Treaty Application No. PCT/CN2018/097300, dated Apr. 2, 2019, 10 pages.

Dashti Saber et al: "An efficient sketch-based framework to identify multiple heavy-hitters and its application in DoS detection", 2014 $22^{nd}$ Iranian Conference on Electrical Engineering (ICEE), IEEE, May 20, 2014 (May 20, 2014), pp. 1113-1118, XP032699897, 001: 10.1109/IRANIANCEE.2014.6999702 [retrieved on Dec. 29, 2014].

* cited by examiner

METHOD, DEVICE, AND SYSTEM FOR NETWORK TRAFFIC ANALYSIS

RELATED APPLICATION

This application claims priority to PCT Application No. PCT/CN2018/097300, filed on Jul. 27, 2018, which is incorporated herein by reference in its entirety.

FIELD OF THE INVENTION

The present disclosure generally relates to security of communication networks and applications, and more specifically, to a method, device, and system for network traffic analysis.

BACKGROUND

Network attacks that are the main threats of security over the Internet have attracted special attention. The openness and interconnection of the network and the security vulnerabilities of protocols and software lead to multiple and multi-level network attacks. Distributed Denial of Service (DDoS) flooding attack is one of the typical attacks over the Internet. It aims to flood a victim and occupies the victim's resources so that the victim cannot provide normal services for legitimate users.

How to detect DDoS flooding attacks is a hot topic in the field of network security. The methodologies widely used to detect DDoS flooding attacks comprise statistical method, machine learning, and knowledge-based method. With the continuous expansion of network scale, the continuous growth of network traffic brings great challenges to the detection methods for DDoS flooding attacks. Incomplete network traffic collection or non-real-time processing of large-scale network traffic will seriously affect the accuracy and efficiency of attack detection. Moreover, most current detection methods for DDoS flooding attacks are using static models.

Thus, there is a need for improving the detection and mitigation for DDoS flooding attacks.

Some Example Embodiments

To overcome the problem described above, and to overcome the limitations that will be apparent upon reading and understanding the prior arts, the disclosure provides a method, device, and system for network traffic analysis.

According to the first aspect of the disclosure, a method for network traffic analysis is presented. The method comprises the steps of: obtaining traffic data of current time interval; recording the traffic data in a Chinese Remainder Theorem based Reversible Sketch (CRT-RS) based on a hash operation comprising Modulo operations, wherein the modulus of the Modulo operations are selected from the modulus in Chinese Remainder Theorem (CRT) as pairwise coprime integers and the CRT-RS includes a plurality of buckets; detecting abnormal buckets in the CRT-RS based on a change between the traffic data of current time interval and traffic data of previous time interval; and recovering abnormal source address associated information based on the abnormal buckets.

According an exemplary embodiment, the traffic data comprises at least one data packet, the step of recording the traffic data in a CRT-RS comprises: deriving at least one pairwise item from the at least one data packet, wherein the pairwise item includes a key and an associated value of the key; and recording the at least one pairwise item in the CRT-RS.

According an exemplary embodiment, the key is source address associated information derived from the data packet and is at least one of: a source address, a combination of a source address and a port, a range of source addresses; and one or more fields in a header of data packet.

According an exemplary embodiment, the associated value of the key is statistics information of the data packets corresponding to the key.

According an exemplary embodiment, the associated value comprises at least one component, the component is at least one of: the number of Transmission Control Protocol (TCP) packets corresponding to the key; the number of User Datagram Protocol (UDP) packets corresponding to the key; the number of Internet Control Message Protocol (ICMP) packets corresponding to the key; the distribution of packet size corresponding to the key; and the distribution of destination address corresponding to the key.

According an exemplary embodiment, recording the at least one pairwise item in the CRT-RS comprises: mapping each of the at least one key to buckets in the CRT-RS by using hash operations; adding the associated value of each of the at least one key to the values of corresponding buckets in the CRT-RS.

According an exemplary embodiment, mapping each of the at least one key to buckets in the CRT-RS by using hash operation comprises: performing a plurality of hash operations to each of the at least one key, wherein each of the hash operations at least comprises Modulo operations, and the modulus of Modulo operations are selected from the modulus in Chinese Remainder Theorem (CRT) as pairwise coprime integers; and determining the position of the bucket in the CRT-RS based on the serial number of the hash operation in the plurality of hash operations and the corresponding function value of the hash operation.

According an exemplary embodiment, the serial number of the hash operation in the plurality of hash operations denotes the row number of the bucket and the corresponding function value of the hash operation denotes the column number of the bucket.

According an exemplary embodiment, the modulus of Modulo operations in the hash operations are arranged in descending order.

According an exemplary embodiment, the modulus of Modulo operations are selected based on a number of source addresses indicated by the source address associated information.

According an exemplary embodiment, recording the traffic data in a Chinese Remainder Theorem based Reversible Sketch further comprises: combining the values of corresponding buckets in the CRT-RSs from a plurality of nodes obtaining and recording the traffic data.

According an exemplary embodiment, detecting abnormal buckets in the CRT-RS based on a change between the traffic data of current time interval and the traffic data of previous time interval comprises: for each bucket and each component of the associated value, calculating a cumulative sum of the bucket of current time interval, based on the cumulative sum of the bucket of previous time interval and a change of the value of the bucket of current time interval, the change of the value of the bucket of current time interval is calculated based on the value of the bucket of current time interval, the mean value of the bucket of current time interval, and the standard deviation of the bucket of current time interval with a scaling factor.

According an exemplary embodiment, the mean value of the bucket of current time interval is calculated based on the value of the bucket of current time interval and the mean value of the bucket of previous time interval, wherein at least one of the value of the bucket of current time interval and the mean value of the bucket of previous time interval is calculated with a weighting coefficient.

According an exemplary embodiment, the standard deviation of the bucket of current time interval is calculated based on the value of the bucket of current time interval, the mean value of the bucket of current time interval, and the standard deviation of the bucket of previous time interval, wherein at least one of the value of the bucket of current time interval, the mean value of the bucket of current time interval, and the standard deviation of the bucket of previous time interval is calculated with a weighting coefficient.

According an exemplary embodiment, detecting abnormal buckets in the CRT-RS based on a change between the traffic data of current time interval and the traffic data of previous time interval further comprises: determining an abnormal bucket, if the cumulative sum of the bucket of current time interval for each component of the associated value exceeds a first threshold.

According an exemplary embodiment, the first threshold is different for different components of the associated value.

According an exemplary embodiment, detecting abnormal buckets in the CRT-RS based on a change between the traffic data of current time interval and the traffic data of previous time interval further comprises: determining an abnormal bucket, if the sum of the cumulative sum of the bucket for all the components of the associated value exceeds a second threshold.

According an exemplary embodiment, detecting abnormal buckets in the CRT-RS based on a change between the traffic data of current time interval and the traffic data of previous time interval further comprises: setting the values of the cumulative sum of the bucket of current time interval, the mean value of the bucket of current time interval, and the standard deviation of the bucket of current time interval, as the values of the cumulative sum of the bucket of previous time interval, the mean value of the bucket of previous time interval, and the standard deviation of the bucket of previous time interval respectively, for each of the detected abnormal buckets.

According an exemplary embodiment, recovering abnormal source address associated information based on the abnormal buckets comprises: recovering the key corresponding to the abnormal buckets by solving the hash operations based on the positions of the abnormal buckets; and obtaining the abnormal source address associated information from the key.

According an exemplary embodiment, recovering abnormal source address associated information based on the abnormal buckets comprises: recording the positions of the buckets mapped corresponding to each of the at least one key in a mapping list; recovering the key corresponding to the abnormal buckets by matching the positions of the abnormal buckets to the positions of buckets in the mapping list.

According an exemplary embodiment, the method further comprises: adding the abnormal source address associated information into a blacklist.

According an exemplary embodiment, the method further comprises: adding the abnormal source address associated information into the blacklists of a plurality of nodes.

According an exemplary embodiment, the method further comprises: filtering a data packet of the traffic data based on the abnormal source address associated information in the blacklist.

According the second aspect of the disclosure, a device for network traffic analysis is presented, and the device comprises: an obtaining unit configured to obtain traffic data of current time interval; a recording unit configured to record the traffic data in a Chinese Remainder Theorem based Reversible Sketch (CRT-RS) based on a hash operation comprising Modulo operations, wherein the modulus of the Modulo operations are selected from the modulus in Chinese Remainder Theorem (CRT) as pairwise coprime integers and the CRT-RS includes a plurality of buckets; a detecting unit configured to detect abnormal buckets in the CRT-RS based on a change between the traffic data of current time interval and traffic data of previous time interval; a recovering unit configured to recovering abnormal source address associated information based on the abnormal buckets; and a storage unit configured to store the CRT-RS.

According an exemplary embodiment, the traffic data comprises at least one data packet, the recording unit is further configured to: derive at least one pairwise item from the at least one data packet, wherein the pairwise item includes a key and an associated value of the key; and record the at least one pairwise item in the CRT-RS.

According an exemplary embodiment, the key is source address associated information derived from the data packet.

According an exemplary embodiment, the key is at least one of: a source address, a combination of a source address and a port, a range of source addresses, and one or more fields in a header of data packet.

According an exemplary embodiment, the associated value of the key is statistics information of the data packets corresponding to the key.

According an exemplary embodiment, the associated value comprises at least one component, the component is at least one of: the number of TCP packets corresponding to the key; the number of UDP packets corresponding to the key; the number of ICMP packets corresponding to the key; the distribution of packet size corresponding to the key; and the distribution of destination address corresponding to the key.

According an exemplary embodiment, the recording unit is further configured to: map each of the at least one key to buckets in the CRT-RS by using hash operations; and add the associated value of each of the at least one key to the values of corresponding buckets in the CRT-RS.

According an exemplary embodiment, the recording unit is further configured to: perform a plurality of hash operations to each of the at least one key, wherein each of the hash operations at least comprises Modulo operations, and the modulus of Modulo operations are selected from the modulus in Chinese Remainder Theorem (CRT) as pairwise coprime integers; and determine the position of the bucket in the CRT-RS based on the serial number of the hash operation in the plurality of hash operations and the corresponding function value of the hash operation.

According an exemplary embodiment, the serial number of the hash operation in the plurality of hash operations denotes the row number of the bucket and the corresponding function value of the hash operation denotes the column number of the bucket.

According an exemplary embodiment, the modulus of Modulo operations in the hash operations are arranged in descending order.

According an exemplary embodiment, the modulus of Modulo operations are selected based on a number of source addresses indicated by the source address associated information.

According an exemplary embodiment, the detecting unit is configured to: for each bucket and each component of the associated value, calculate a cumulative sum of the bucket of current time interval, based on the cumulative sum of the bucket of previous time interval and a change of the value of the bucket of current time interval, the change of the value of the bucket of current time interval is calculated based on the value of the bucket of current time interval, the mean value of the bucket of current time interval, and the standard deviation of the bucket of current time interval with a scaling factor.

According an exemplary embodiment, the mean value of the bucket of current time interval is calculated based on the value of the bucket of current time interval and the mean value of the bucket of previous time interval, wherein at least one of the value of the bucket of current time interval and the mean value of the bucket of previous time interval is calculated with a weighting coefficient.

According an exemplary embodiment, the standard deviation of the bucket of current time interval is calculated based on the value of the bucket of current time interval, the mean value of the bucket of current time interval, and the standard deviation of the bucket of previous time interval, wherein at least one of the value of the bucket of current time interval, the mean value of the bucket of current time interval, and the standard deviation of the bucket of previous time interval is calculated with a weighting coefficient.

According an exemplary embodiment, the detecting unit is further configured to: determine an abnormal bucket, if the cumulative sum of the bucket of current time interval for each component of the associated value exceeds a first threshold.

According an exemplary embodiment, the first threshold is different for different components of the associated value.

According an exemplary embodiment, the detecting unit is further configured to: determine an abnormal bucket, if the sum of the cumulative sum of the bucket for all the components of the associated value exceeds a second threshold.

According an exemplary embodiment, the detecting unit is further configured to: setting the values of the cumulative sum of the bucket of current time interval, the mean value of the bucket of current time interval, and the standard deviation of the bucket of current time interval, as the values of the cumulative sum of the bucket of previous time interval, the mean value of the bucket of previous time interval, and the standard deviation of the bucket of previous time interval respectively, for each of the detected abnormal buckets.

According an exemplary embodiment, the recovering unit is further configured to: recover the key corresponding to the abnormal buckets by solving the hash operations based on the positions of the abnormal buckets; and obtain the abnormal source address associated information from the key.

According an exemplary embodiment, the recovering unit is further configured to: record the positions of the buckets mapped corresponding to each of the at least one key in a mapping list; and recover the key corresponding to the abnormal buckets by matching the positions of the abnormal buckets to the positions of buckets in the mapping list; and the storage unit is further configured to store the mapping list.

According an exemplary embodiment, the storage unit is further configured to: store a blacklist for storing the abnormal source address associated information.

According an exemplary embodiment, the device further comprises: a filtering unit configured to filter a data packet of the traffic data based on the abnormal source address associated information in the blacklist.

According the third aspect of the disclosure, a system for network traffic analysis is presented, the system comprises a plurality of devices according to the first aspect.

According an exemplary embodiment, the system further comprises a management device, the management device comprises: a management unit configured to combine the values of corresponding buckets in the CRT-RSs from the plurality of devices.

According an exemplary embodiment, the management unit is further configured to: add the abnormal source address associated information into the blacklists of the plurality of devices.

According the fourth aspect of the disclosure, an apparatus comprising means for performing a method according to the first aspect is presented.

According to the fifth aspect of the disclosure, a non-transitory computer-readable storage medium is presented, the non-transitory computer-readable storage medium stores instructions which, when executed by one or more processor, cause the processor to perform a method according to the first aspect.

Still other aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details may be modified in various obvious respects, all without departing from the spirit and scope of the disclosure. Accordingly, the drawings and description are to be regarded as illustrative in nature, and not as restrictive.

BRIEF DESCRIPTION OF THE DRAWINGS

The exemplary embodiments of the disclosure are illustrated by way of example, and not by way of limitation, in the figures of the accompanying drawings.

DETAILED DESCRIPTION OF THE INVENTION

Figure 1:
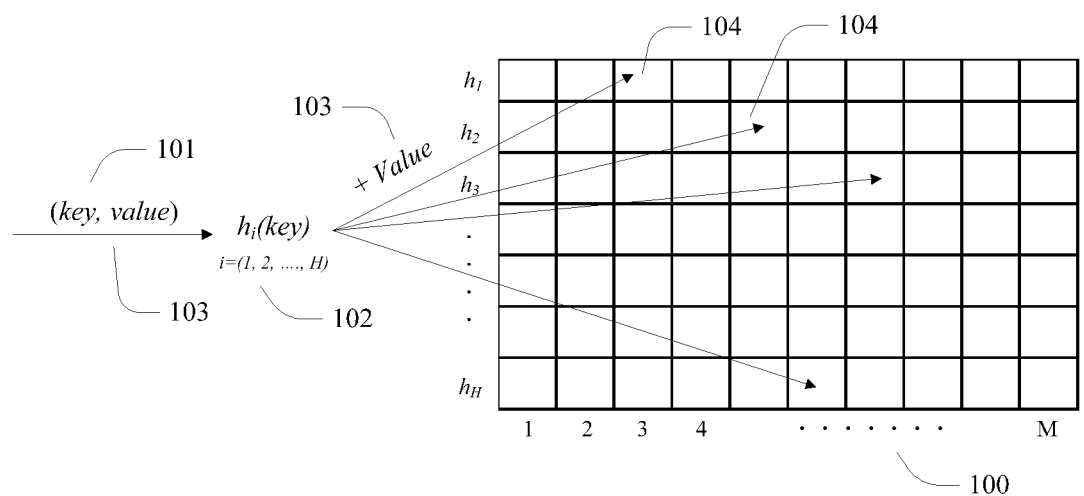
FIG. 1 illustrates a diagram of the sketch according to an exemplary embodiment of present disclosure.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

DDoS flooding attacks can be generated in two ways: direct flooding attacks and indirect flooding attacks. In direct flooding attacks, namely Network/Transport Layer and Application Layer DDoS flooding attacks, attackers usually spoof source IP address of attack data packets and send them to the victim directly. In the case of indirect flooding attacks, namely Distributed Reflection DoS (DRDoS) and link flooding attacks, attackers use many innocent intermediates to flood victim indirectly.

There are three methodologies widely used to detect DDoS flooding attacks. The first is statistical methods that observe network activities and generate a profile to represent normal network behaviors. By measuring the similarity between the profile that extracted from current collected network traffic and the normal behavior profile, the method judges whether there are existing anomalies in the network. The second is machine learning that establishes the judging criterion of network traffic through training a large number of data and uses this criterion to analyze and determine whether the current collected traffic is abnormal. The third is knowledge-based methods that compare network events with pre-defined attack rules or attack patterns to detect network attacks.

DDoS flooding attacks have become a serious problem in network security. Researchers have proposed many methods for detecting DDoS flooding attacks. The following is the existing related work about DDoS flooding attacks detection.

Detection Methods against Direct DDoS Flooding Attacks

An exemplary solution considers two detection features for UDP flooding attacks targeted to a particular destination: (i) the count of total destination port changes for non-spoofed source addresses with random destination ports, and (ii) the count of source addresses changes for randomly spoofed source addresses. A KD-Tree that each node represents a unique source address is used to record information of incoming traffic. In each time interval, a pre-order traversal of the KD-Tree is performed to calculate the entropies of the count of destination port changes and the count of source address changes. An alarm will be raised to indicate UDP flooding attacks when the two entropies beyond a preset threshold. Another approach utilizes source address and destination address to aggregate packets into flows. Based on the knowledge that attack packets that originated from the same botnet have the similar size, the researcher calculates entropy of the distribution of packet size in each flow. The more concentrated the packet size is, the lower the entropy is. The DDoS flooding attacks is detected by measuring the entropy deviation between normal and current traffic. Some researchers provide an efficient detection method deployed at data centers by applying CKNN (K-nearest neighbors traffic classification with correlation analysis) on flow-level data. They aggregated packets that come from the data center network with identical 5 tuples (viz. source and destination addresses, source and destination ports, and protocol type). Each flow can be represented by a set of statistical features, such as flow duration, flow size, etc. Due to the high correlation among the flows, which were generated by the same application, the method can detect attacks by examining flow features with CKNN classification and correlation analysis. Another solution discusses five kinds of skillful SYN flooding attacks and proposed an accurate and fast detection method, named $SACK^2$. Under a normal TCP three-way handshake, the number of SYN-ACK packets that a server sends should be almost equal to the number of ACK packets that a client sends. However, during the SYN flooding attack, this balanced relationship will be broken with a large deviation as there are no corresponding ACK packets. $SACK^2$ utilizes counting bloom filters to observe the difference of SYN-ACK packets and ACK packets in number. Each bucket in bloom filters is a hash value that is calculated by using client's and server's IP addresses, client and server's ports, and client and server's initial sequence numbers of TCP packets.

Detection Methods against Indirect DDoS Flooding Attacks

Some researchers found that the rate of responsive flows from reflectors in DRDoS flooding attacks has linear relationship with each other because they are simulated by the same attacking traffic. They defined all packets to a victim through one router as a flow. Spearman's rank correlation coefficient was employed to calculate the flow correlation coefficient between flow pairs to differentiate attack traffic from legitimate traffic. The method exploits the similar characteristics of DRDoS flooding attack traffic. In another approach, several features are selected from DNS query traffic, such as the mean of inter packet arrival time from same IP, probability of occurrence of an IP per 15 seconds, minimum, average and maximum packet size, etc. the DNS traffic is classified into normal and abnormal by employing Decision Tree, Multilayer Perceptron, Naïve Bayes and SVM. Attribute selection algorithms such as Information Gain, Gain Ratio and Chi Square are used to reduce the redundant features. The experimental results show that Decision Tree achieves the highest accuracy of 99.3%. Attack packets that are generated by the same botnet have a high similarity on packet-level data. Other researchers proposed a reflector-end detection method for DNS amplification flooding attacks. Three features are extracted per unit time, including the number of DNS request packets, the ratio of DNS response packet size to DNS request packet size and the ratio of the number of DNS response packets to the number of DNS request packets. Then, k-means algorithm is used to classify normal and abnormal clusters to make a detection pattern and calculate reference points. Based on the detection pattern, new data is whether normal or not is determined by its distance from the reference point of each group. Rerouting traffic is a feasible method to detect link flooding attacks. Another exemplary solution formulated a detection method of link flooding attacks via relational algebra. It represents the association of bots to potential targets. The traffic is continuously rerouted in a manner so that bots are forced to persistent participation in link flooding events. Thus, the bots exhibit suspicious behaviors and reveal their presence. A collaborative re-routing system is also proposed that reroutes legitimate traffic to uncongested links while limits bandwidth available to attack traffic at congested links.

There are numerous detection methods for DDoS flooding attacks. However, few of existing studies considered the impact that the large-scale network traffic brings to and satisfied the detection requirements of self-adaptive detection and protocol independence. These methods are facing several problems in the field of DDoS flooding attack detection as follows:

(1) Lack of effective network traffic compression and fusion methods. The increasing network traffic demands that a detection method must have the capability of processing large-scale network traffic, and at the same time ensures high detection accuracy with high efficiency. Otherwise, the detection method will become inefficient or even useless when dealing with large-scale network traffic. Effective compression and fusion of network traffic, completely describing network traffic information in the form of a summary and accurately locating the abnormal traffic, can greatly eliminate the impact that the large-scale network traffic brings to the network attack detection. However, effective detection methods for DDoS flooding attacks that can compress and fuse large-scale network traffic with high accuracy are still missed in the literature.

(2) Lack of self-adaptive and protocol independent detection methods. Most detection methods typically build normal profile for network behaviors, and detect intrusion based on the deviation between normal profile and current network profile. But an attacker can elaborately launch attacks by intentionally training detection methods to make it gradually accept abnormal network behaviors as normal. Facing such an attack, it is hard to define what types of network behaviors are normal. If the patterns of normal network behaviors are wrong or incomplete, the detection methods will have a high false alarm rate. Therefore, the detection methods should adaptive to the changes of current network behaviors instead of mainly depending on a static profile. Moreover, there are many kinds of DDoS flooding attacks in the context of various networking protocols. The method cannot predict when and which type of attacks will occur. A qualified detection method should be protocol independent for detecting DDoS flooding attacks. Both direct and indirect DDoS flooding attacks have their own attack characteristics and could exploit multiple protocols to launch attacks. So a protocol-independent method is expected to detect a category of DDoS flooding attacks instead of detecting a specific protocol-related attack.

Due to above-mentioned defects, universal network attack detection methods are urgently needed, which have the ability of dealing with large-scale network traffic, have the characteristics of self-adaptive detection and support protocol independence.

The exemplary embodiment of this disclosure proposes a novel network traffic fusion and analysis method, device, and system against DDoS flooding attacks. First, with the purpose of having the global network traffic information, a new Chinese Remainder Theorem based Reversible Sketch (CRT-RS) is designed to effectively compress and fuse network traffic. The sketch is generated base on the modulus of CRT such that it is reversible. The reversible sketch based on CRT can not only effectively compress and fuse network traffic but also has the ability of reversely recovering the anomalous source addresses. Second, a multi-dimensional change-point detection method for DDoS flooding attacks by using a Modified Multi-chart Cumulative Sum (MM-CUSUM) algorithm is designed to monitor the abrupt changes upon the traffic data record that generated by CRT-RS. The Multi-chart Cumulative Sum means that the Cumulative Sum is calculated in multiple dimensions or components of a vector representing the characteristics of the traffic data. The MM-CUSUM algorithm is used for multidimensional change-point detection for DDoS flooding attacks to monitor the abrupt changes upon the traffic record. By employing the CRT-RS and MM-CUSUM algorithm to perform traffic fusion, analysis and attack detection, the proposed method, device, and system according to some embodiments of present disclosure are capable of handling large-scale network traffic, discovering anomalous source addresses, realizing self-adaptive detection and supporting protocol independence.

DDoS flooding attacks usually flood a victim with massive attack data packets. Thus, a dramatic increase in the number of data packets is an indicator of DDoS flooding attacks. Moreover, current DDoS flooding attacks are often launched by a botnet. Each bot, which is infected by the same malicious program, generates attack data packets in the same format. The attack data packets share many similar characteristics, such as packet size, packet rate, destination address, destination port, etc. But these characteristics are quite different from legitimate packets so that they can also be used to detect DDoS flooding attacks, for example.

In the following, theoretical background of the disclosure is first illustrated briefly. Then, according to an exemplary embodiment of the disclosure, the new reversible sketch based on Chinese Remainder Theorem (CRT-RS) is introduced in details.

The data structures for summarizing traffic data of network comprise hash value, bitmap, pile, trie tree, sketch, etc. Traditional sketch is a compact and constant-size data structure that summarizes network traffic by using hash functions to randomly aggregate traffic. The sketch is widely used in network performance monitoring, network management, attack detection and flow engineering. In some embodiments of present disclosure, the modulus in hash functions that selected from the family of k-universal hash functions is replaced with the modulus in CRT and the notion of modular coefficient description in number theory is employed to keep the remainders. By doing this, the new CRT-RS can not only obtain the same capacities of the traditional sketch but also have the ability of reversely discovering the anomalous source addresses. Therefore, in the process of network traffic collection, the CRT-RS effectively compresses and fuses network traffic. In each bucket of CRT-RS, a vector is constructed to record traffic information. Each dimension in the vector is the statistical information of network traffic, such as the number of packets, the distribution of packet size, the number of different destination addresses, etc.

Sketch

First, in an exemplary embodiment of the disclosure the method, device and system for network traffic analysis capture the traffic data from network. The traffic data may comprise a plurality of data packets. The destinations of some of the data packets may be the device for network traffic analysis, which is also referred as node, then the data packets obtained by the device or system can be referred as the received data packets, and the traffic data can be referred to as received traffic data. The destinations of other of the data packets may not be the device or node for network traffic analysis, and the device only forwards the data packets, then the data packets obtained by the device or node can be referred as the incoming or arriving data packets, and the traffic data can be referred as incoming or arriving traffic data. For ease of reference, the traffic data obtained by the device or node for network traffic analysis is called as incoming or arriving traffic data in the context of present description.

The sketch 100 is a probabilistic data summarization technique and is composed of H hash tables of size M, where M is a positive integer, as shown in FIG. 1. The hash table means the table or diagram of the function value of a set or family of hash functions 102 comprising H hash functions, where H is a positive integer. Incoming network traffic data is modeled as pairwise items encompassing a key 101 and an associated value 103 of the key 101, where the key 101 is the source address associated information, such as the size of a packet, the number of the packets, the distribution of the packets, etc., and the value 103 can be any accumulative feature, for example, the statistics information of the data packets corresponding to the key 101.

In an exemplary embodiment of the disclosure, based on the definitions of the pairwise items comprising the key 101 and the associated value 103 of the key 101, many pairwise items corresponding to respective key 101, i.e., source address associated information, can be derived from the traffic data and recorded in the sketch 100. The traffic data information is recorded in the sketch by recording the pairwise items derived from the traffic data.

Each row i of the sketch 100 is associated with an independent hash function $h_i$ that maps an incoming key 101 into a hashing space of (0, 1, 2, ..., M−1), where i=(1, 2, ..., H). The number of row, i, can also be considered as the serial number of the hash operation in H hash operations. The number of column, i.e., hashing space of (0, 1, 2, ..., M−1), can also be considered as the corresponding function value of the hash operation. In such manner, the traffic data can be recorded into the sketch 100 by mapping the key 101 in respective pairwise items into the sketch 100 with a set of buckets 104. If the source address associated information represented by key 101 is sequential, the positions of the buckets 104 are sequenced in a predetermined order accordingly. The sketch 100 comprises a plurality of buckets 104. The data (value 103 of the key 101) whose keys are hashed to the same values will be put in the same bucket 104 of the sketch 100 and the values of the bucket 104 will be added up. Usually, H hash functions in a sketch 100 are chosen from the family of k-universal hash functions defined in Equation (1), $$h(x) \equiv \sum_{i=0}^{k-1}(a_i x^i + b_i) \mathrm{mod} r \mathrm{mod} M \quad (1)$$

where r is an arbitrary prime (e.g., Mersenne prime numbers are chosen for fast implementation), $a_i$ ($\neq 0$) and $b_i$ are randomly selected from the set of (0, 1, ..., r−1), M is the width of sketch 100. For example, k can be selected as 2 or 4, and k=r=M to simplify the calculation of hash functions 102. In some embodiments, r can also be a very large arbitrary prime such that the value of operation of x mod r would be x to simplify the hash operation too. Using k-universal hash functions, the probability that two keys 101 are aggregated in the same bucket 104 over H hash tables is $(1/M)^{k*H}$. For example, the probability of aggregation can be reduced by using M with high value and/or H with high value. If the number of H is chosen as a very high value, the calculation amount of the hash functions would be massive. In practice, H is usually selected to 5 to 6 to keep the calculation amount of the hash functions as small as enough. In some embodiment of present disclosure, Modulo M of operation mod M in the hash operations, i.e., the width of the sketch 100, is selected as a high value of positive integer to meet a proper probability of aggregation.

It is noted that the forms of the hash functions 102 are not limited to the family of k-universal hash functions defined in Equation (1). Other hash functions 102 can also be used to map the key 101 into the sketch 100. For example, the hash functions can be selected as $h_i(x) \equiv (a_i x + b_i)$ mod M or other forms with more complicated operations. In general, the hash functions comprise Modulo operations in order to map the key 101 of the parewise item into a sketch 100.

Chinese Remainder Theorem based Reversible Sketch (CRT-RS)

Figure 2:
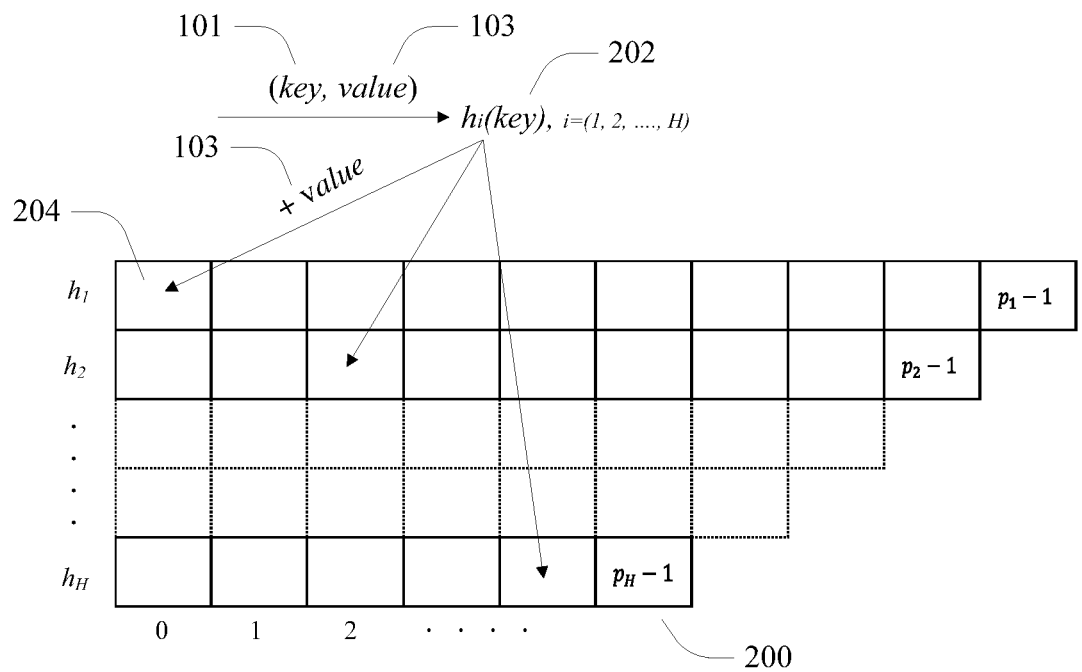
FIG. 2 illustrates a diagram of the CRT-RS according to an exemplary embodiment of present disclosure.

In a traditional sketch, we cannot report the set of keys that exhibit abnormal due to the irreversibility of hash functions. This means that the traditional sketch is not reversible. To address this problem, some exemplary embodiments of present disclosure propose the Chinese Remainder Theorem based Reversible Sketch (CRT-RS) 200, as shown in FIG. 2. Comparing with traditional sketch 100 discussed above with reference to FIG. 1, the modulus of hash function of the H hash functions 102, i.e., in each row i of H rows, are replaced with the modulus in Chinese Remainder Theorem (CRT), so that unequal number of buckets 204 in each row of CRT-RS 200 is obtained. The new hash functions 202 comprising Modulo operations, where the modulus of the Modulo operations are selected from the modulus in CRT, can be represented as following Equation (2):

$$h(x) \equiv \sum_{i=0}^{k-1}(a_i x^i + b_i) \mathrm{mod} r \mathrm{mod} p_i \quad (2)$$

where $p_1, p_2, \ldots, p_H$ are selected as pair-wise coprime integers in CRT, and these modulus are sequenced in descending order, i.e., $p_1 > p_2 > \ldots > p_H$. Such configuration has the probability that two keys 101 are aggregated in the same bucket 204 in each row is $(1/p_i)^2$. This descending order can improve the accuracy of reversely recover the abnormal source addresses. For example, the value of $p_i$ can be set around $2^{20}$ with respect to $2^{32}$ source addresses, such that the aggregation probability of CRT-RS is sufficient low to improve the accuracy of recovering, i.e., deriving the source address associated information based on the abnormal buckets 204. In another embodiment, the modulus can also be sequenced in ascending order, i.e., $p_1 < p_2 < \ldots < p_H$.

In some embodiments, we can also set r to a very large arbitrary prime, set k to 2, set a to 1 and set b to 0 in Equation (2). Therefore, the hash functions 202 in CRT-RS that are optimized are rather simple but efficient, as defined in Equation (3):

$$h_i(x) \equiv x \bmod p_i \; i=(1,2,\ldots,H) \quad (3)$$

In the CRT-RS 200, the number of columns in row i is $p_i$ instead of M in the sketch 100 as shown in FIG. 1. Since the column number of each row in CRT-RS is different and can be sequenced with a predetermined order, the CRT-RS 200 has an additional dimension or item to record more information about the pairwise item of (key, value) in comparison to the sketch 100 in FIG. 1, and such additional dimension or item can be used for reversely recovering.

In the CRT-RS 200, each bucket 104 can be represented as RS[i][j], i=(1, 2, . . . , H), j=(0, 1, 2, . . . , $p_i$−1). There are four basic operations defined for CRT-RS 200:

(1) UPDATE: In an exemplary embodiment of the disclosure, the arriving traffic data during a time interval is obtained and modeled into at least one pairwise item as the new pairwise item. When the new pairwise item (key, value) arrives to be recorded in the CRT-RS, the key of the pairwise item will be hashed H times by H hash functions of $\{h_1, h_2, h_H\}$ and the associated value of the key will be added to the corresponding bucket in each column of CRT-RS, namely $$RS[i][h_i(key)] += value, i=(1,2, \ldots ,H) \quad (4)$$

Based on the Equation (3), it is noted that the column number of the bucket in row i mapped from the key, i.e., $h_i(key)$, represents that the bucket is the $(h_i(key)+1)^{th}$ bucket from the left in the row.

(2) QUERY: The query of a key is defined as follow:

$$QUERY(key) = median_{i=(1,2, \ldots ,H)}\{RS[i][h_i(key)]\} \quad (5)$$

where operation $median_i\{\ \}$ means calculating the median of the values of the bucket in the row i. For example, the operation $median_i\{\ \}$ can also be selected as calculating the mean value of the values of the buckets in the row i. The result of query of a key, i.e., the mean value of the associated value of the key, represents the average statistical information from the source address or a group of source addresses corresponding to the source address associated information represented by the key.

(3) COMBINE: Multiple CRT-RSs with the same sketch parameters can be combined into a single one by accumulating the value in each bucket of each CRT-RS. In some embodiments of the disclosure, the method for network traffic analysis is performed on a system comprising at least one device or node (for example, a distributed server system), which perform the network traffic analysis against DDoS flooding attack respectively. Each of the nodes obtains the arriving traffic data during a time interval, and recording the traffic data into the respective CRT-RS. The central node or the supervisory node can combine all of the CRT-RSs into one CRT-RS to perform network traffic analysis from an overall perspective. The combined CRT-RS can be used in the next procedure and the information about the DDoS flooding attack based on the abnormal buckets in the CRT-RS, such as the source address of the attack data packet. The central node or the supervisory node may be one of the nodes performing the network service and/or network traffic analysis, or may be an individual node which performs the network traffic analysis only. In an embodiment, the central node or the supervisory node may obtain the traffic data from the network as other nodes or gather the CRT-RSs from the other nodes without collecting the traffic data.

For example, we combine a set of CRT-RSs, $\{RS_1, RS_2, \ldots , RS_l\}$:

$$RS_{combination}[i][j] = \sum_{n=1}^{l} RS_n[i][j] \quad (6)$$

where l is the number of nodes that recording the CRT-RS, and l>0.

(4) RECOVER: The RECOVER functions of CRT-RS aims to reversely recovering a set of keys that exhibit abnormal. Firstly the simplest scenario is considered. Assume one key exhibits abnormal, so that there is only one marked abnormal bucket in each row of CRT-RS, denoted as $c_1, c_2, \ldots , c_H$. Based on Equation (3), the following simultaneous congruence Equation (7) is obtained:

$$x \equiv c_1 \bmod p_1, x \equiv c_2 \bmod p_2, \ldots , x \equiv c_H \bmod p_H \quad (7)$$

Based on CRT, x can be determined with the following Equation (8):

$$x \equiv \sum_{i=1}^{H} Q_i Q'_i c_i \bmod P \quad (8)$$

where $P = p_1 p_2 \ldots p_H$, $Q_i = P/p_i$, and $Q_i Q'_i \equiv 1 \bmod p_i$, i=(1, 2, . . . , H). Thus the hash functions can be solved by CRT.

Under the general situation, assume w (w>1) keys exhibit abnormal, so that there are w marked abnormal buckets in each row of CRT-RS. In some embodiments of the disclosure, the key corresponding to these abnormal buckets can be recovered by solving the hash functions based on the positions of the abnormal buckets in the CRT-RS. If the similar recover principle that used in a simplest scenario is also applied in the recovering of the key, $w^H$ different possible combinations of abnormal buckets come from different rows will be got. This leads to heavy computational burden. In order to solve this problem, the notion of modular coefficient description in number theory can be employed to record the remainders. For a key, its modular coefficient description is $\langle h_1(key), h_2(key), \ldots h_H(key) \rangle$, i=(1, 2, . . . , H). That is to say, modular coefficient description records the column number that a key locates in each row. In some embodiments, a flag can be added to the bucket $RS[i][h_i(key)]$ to record the modular information (column number) of the row i+1 obtained from the modular coefficient description, namely flag=$h_{i+1}(key)$, i=(1, 2, . . . , H−1).

For example, during the recording, the information about the mapping from the key to the buckets in the CRT-RS can be stored into a mapping list. The mapping list can comprise at least the position information of the buckets mapped corresponding to the key, such as, the column number of the bucket in each row of CRT-RS, i.e., the modular coefficient description. Therefore, when there are many marked abnormal buckets in each row, the modular information (column number) recorded by the flag from the first row to the last row can be matched with the stored modular coefficient descriptions of all keys that have been hashed into the CRT-RS in the mapping list. After that, all the abnormal keys can be recovered by using CRT based on the matched modular coefficient descriptions, and then the abnormal source address associated information can be derived from the key. Such approach has less computation burden than the normal approach and will reduce the false reporting rate. For example, the flag representing the modular coefficient description can also derived based on the column number of the abnormal buckets without storing the flag in the value of the buckets. In some embodiments, the mapping list can be stored in an individual storage or the related storage field associated with the key or the pairwise item.

After recovering the abnormal source address associated information, the source address or a group of source addresses sending the DDoS flooding attack, which are referred as abnormal source address, can be obtained. The abnormal source address can be stored in a blacklist. The traffic data obtained in each time interval may comprise the attack data packets from new abnormal source address, then the new abnormal source address is added into the blacklist. In another embodiment, the blacklist can store the abnormal source address associated information represented by the abnormal key recovered from the abnormal buckets. Based on the blacklist, the arriving traffic data can be filtered to block data packets belonging to the source address performing DDoS flooding attacks. The querying of blacklist is discussed in detail below.

System Architecture

Figure 3:
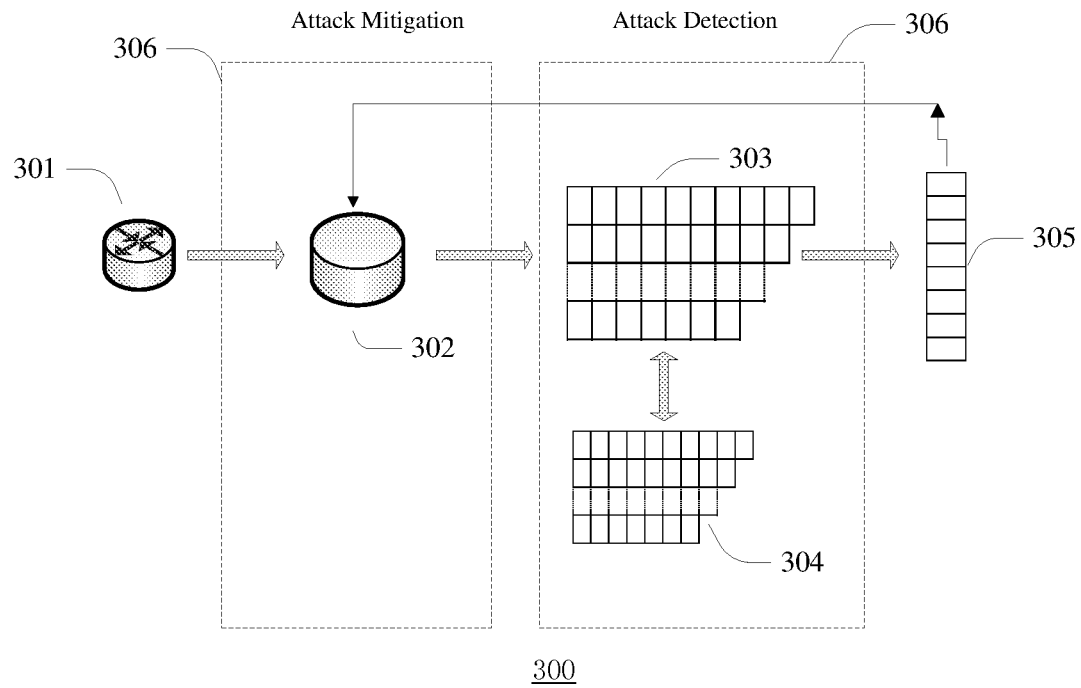
FIG. 3 illustrates a block diagram of a system architecture according to an exemplary embodiment of present disclosure.

FIG. 3 shows the system architecture 300 of method, device and system for network traffic analysis, especially the DDoS flooding attack detection and mitigation, according to an exemplary embodiment of the disclosure. First, the traffic data 301 from the network is filtered by a bloom filter 302 to verify whether the data packets in the new arriving traffic data 301 comes from the source addresses that existed in the blacklist 305 or the source addresses are matched with the abnormal source addresses indicated by the abnormal source address associated information stored in the blacklist 305 during attack the mitigation process 306. If the data packets are sent from the abnormal source addresses, they will be blocked, otherwise they will be forwarded to the attack detection process 306. During the attack detection process 306, the filtered traffic data is compressed and fused with CRT-RS of previous time interval 304 to generate the new CRT-RS 303, i.e., the CRT-RS of current time interval. Then, based on the statistical information of the traffic data generated by CRT-RS 303, a multi-dimensional change-point detection method is applied to find out the abnormal buckets in each row of the CRT-RS 303. Change-point is a concept in Statistics that represents a point that abruptly changes in a stationary distribution process. By exploiting the reversible characteristic of CRT-RS, the abnormal keys are recovered and added to a blacklist 305. Detailed process is introduced below.

Traffic Data Collection

The method for network traffic analysis according to an exemplary embodiment of the disclosure exploits the basic characteristics of DDoS flooding attacks to detect and mitigate them. In CRT-RS, the key of the pairwise item is chosen as source address associated information with the purpose of filtering attack data packets come from abnormal source addresses or a group of source addresses indicated by the source address associated information. The source address associated information is the information about the source address or a group or range of the source addresses of the at least one data packet which is comprised in the traffic data. For example, the source address associated information can be source address, a combination of a source address and a port, a range of source addresses, one or more fields in a header of data packet and the like, and any combination thereof. Furthermore, the source address associated information can be selected from one or more fields in any part of data packet, only if the field or fields can be used to derive the source address of the data packets in the traffic data.

The associated value of the key in the pairwise item, i.e., the value added into the corresponding bucket in each row of CRT-RS, and the value of the bucket in CRT-RS, can be represented as value={$value_1$, $value_2$, $value_3$, $value_4$, $value_5$} and is a multi-dimensional vector, where each dimension is the statistical information of the data packets for different type of statistics aspects comprised in traffic data from network. In the context of present description, the statistical information of each dimension (or called as component) can be called as dimensional feature. The number of the dimensional feature can also be set to others than 5 as listed above, for example. The statistics information of the data packets corresponding to the key, i.e., the dimensional features corresponding to the key, comprises at least one of, for example, (1) the number of Transmission Control Protocol (TCP) packets, (2) the number of User Datagram Protocol (UDP), (3) the number of Internet Control Message Protocol (ICMP), (4) the distribution of packet size, (5) the distribution of destination address, etc., and any combination thereof.

According to an exemplary embodiment, three counters are used to record the dimensional features (1) to (3) respectively. For the dimensional features (4) and (5), for example, histograms can be used to calculate the distribution, where the x-coordinate is packet size/destination address and the y-coordinate is the number of data packets. Then, the entropy is calculated based on each histogram in an exemplary embodiment. The above five dimensional features about the traffic data is used to detect DDoS flooding attacks since they reflect the basic characteristics of this kind of attack. Notably, more dimensional features of traffic data can be involved into the CRT-RS to support attack detection if needed.

DDoS Flooding Attack Detection

In some embodiments of present disclosure, a Modified Multi-chart Cumulative Sum (MM-CUSUM) is used to monitor the abrupt change in each bucket upon the traffic data information recorded in CRT-RS. Multi-chart in MM-CUSUM means the cumulative sum is calculated based on the statistics information of multiple dimensions of value of the pairwise item (key, value). The arriving traffic data is obtained at time intervals, thus the abrupt change in each bucket of CRT-RS is monitored between two adjacent time intervals, such as between the previous time interval and the present time interval. For example, in one of the time intervals, the traffic data can be collected and recorded into CRT-RS within a collection time. After the collection time, the method and device for network traffic analysis may begin the detection for abnormal buckets in CRT-RS by using MM-CUSUM algorithm.

Denote RS(n) is the traffic data information mapped from the traffic data collected in $n^{th}$ time interval, for example. RS[i][j](n) is the value of bucket in row i and column j of CRT-RS, where i=(1, 2, ..., H) and j=(0, 1, ..., $p_i$−1). In an exemplary embodiment of the disclosure, the result of standard CUSUM algorithm $M_g$ [i][j](n) is defined as follow:

$$M_g[i][j](n)=\max\{0, M_g[i][j](n-1)+RS_g[i][j](n)-(\widehat{u_g}[i][j](n)+\beta \cdot \widehat{\sigma_g}[i][j](n))\} \quad (9)$$

where g=(1, 2, 3, 4, 5) is the number of dimensional feature described above, the initial cumulative sum of $M_g[i][i](0)=0$, $\widehat{u_g}$ and $\widehat{\sigma_g}$ are the mean value and standard deviation until $n^{th}$ time interval, the scaling factor of β is a tunable parameter as the weight to adjust the importance between $\widehat{u_g}$ and $\widehat{\sigma_g}$. The weighted sum of ($\widehat{u_g} + \widehat{\sigma_g}$) represents the fluctuation range of the value of bucket of $n^{th}$ time interval, RS[i][j](n). The difference between RS[i][j](n) and ($\widehat{u_g} + \widehat{\sigma_g}$) represents the fluctuation information of the value of bucket of $n^{th}$ time interval. Therefore, the cumulative sum of current time interval for the value of each bucket can be derived based on the cumulative sum of previous time interval and the fluctuation information of the value of bucket of current time interval. $M_g[i][i](n)$ will not change under normal conditions, then $M_g[i][j](n)$ is 0. But if the network traffic increases and the fluctuation of traffic data exceeds the fluctuation range, i.e., there is a significant deviation of $RS[i][j](n)-(\widehat{u_g}+\beta\widehat{\sigma_g})$, $M_g[i][j](n)$ will become to a positive number, which can be considered as an attack alarm. According to equation (9), $M_g[i][j](n)$ reflects the abrupt change in each bucket upon the traffic data information recorded in CRT-RS between the adjacent time intervals.

In some embodiments, the means value $\widehat{u_g}$ and standard deviation $\widehat{\sigma_g}$ can be estimated by Exponential Weighted Moving Average (EWMA) method as following equations:

$$\widehat{u_g}_{[i][j]}(n) = \alpha \cdot \widehat{u_g}_{[i][j]}(n-1)+(1-\alpha)\cdot RS_g[i][j](n) \quad (10)$$

$$\widehat{\sigma_g}_{[i][j]}(n) = \alpha \cdot \widehat{\sigma_g}_{[i][j]}(n-1)+(1-\alpha)\cdot$$
$$\sqrt{(RS_g[i][j](n)-\widehat{u_g}_{[i][j](n)})} \quad (11)$$

where α is a tunable parameter, for example, as the weighting coefficient to adjust the importance between $\widehat{u_g}[i][j](n-1)$ and $RS_g[i][j](n)$ when calculating the mean value of $\widehat{u_g}[i][j](n)$, or as a tunable parameter as the weighting coefficient to adjust importance between $\widehat{\sigma_g}[i][j](n-1)$ and $\sqrt{(RS_g[i][j](n)-\widehat{u_g}[i][j](n))}$ when calculating the standard deviation of $\widehat{\sigma_g}[i][j](n)$. That is, at least one of the items above-mentioned can be calculated with a weighting coefficient. For example, the mean value $\widehat{\sigma_g}$ may also be calculated as the arithmetic mean value, geometric mean value, etc., and the standard deviation $\widehat{\sigma_g}$ may be calculated as the mean square error and the like in some embodiments.

It is noted that the network fluctuation may include the normal increased traffic data, such as the massive accesses due to promotion in some scenarios of on-line shopping. Let $A_g[i][j](n)$ be the decision result at time interval n for dimensional feature g in bucket $RS[i][j]$ of CRT-RS, where "0" indicates normal bucket and "1 and 0.5" indicates abnormal bucket:

$$\text{when } g \in \{1, 2, 3\}, A_g[i][j](n) = \begin{cases} 1, & \text{if } M_g[i][j](n) > \tau 1_g \\ 0, & \text{otherwise} \end{cases} \quad (12)$$

$$\text{when } g \in \{4, 5\}, A_g[i][j](n) = \begin{cases} 0.5, & \text{if } M_g[i][j](n) > \tau 2_g \\ 0, & \text{otherwise} \end{cases} \quad (13)$$

where $\tau 1_g$ is a positive number since the statistics information of dimensional features 1 to 3 is numbers of data packets, and $\tau 2_g$ is a positive value since the statistics information of dimensional features 4 and 5 are distributions. $\tau 1_g$ and $\tau 2_g$ are set as positive instead of zero in Equation (9) is to offset network fluctuation, thus they can be considered as a threshold for each dimensional feature, i.e., the threshold of the cumulative sum of bucket in each row and each column of CRT-RS of $n^{th}$ time interval for each dimension or component of the statistics information of associated value of the key. For example, $\tau 1_g$ can be selected as different or same positive number for each of the dimensional features 1 to 3 respectively, and $\tau 2_g$ can be selected as different or same positive value for each of the dimensional features 4 and 5 respectively.

The value of $A_g[i][j](n)$ can also be selected as different value according to the importance of the dimensional features in some embodiments of the disclosure. In Equations (12) and (13), the value of $A_g[i][j](n)$ is 1 for dimensional features 1 to 3 if the cumulative sum exceeds the threshold of $\tau 1_g$ and is 0.5 for dimensional features 4 to 5 if the cumulative sum exceeds the threshold of $\tau 2_g$, due to the dimensional features 1 to 3 are considered as more important than the dimensional features 4 and 5. The value pair (1, 0.5) of $A_g[i][j](n)$ in the above example can also be chosen as others, such as (1, 0.8), (1, 0.1), etc., in other embodiments of present disclosure.

The final decision for abnormal bucket of bucket $RS[i][j](n)$ is the decision fusion $FA[i][j](n)$ of $A_g[i][j](n)$ as defined in Equation (14):

$$FA[i][j](n) = \begin{cases} \text{abnormal,} & \text{if } \sum_{g=1}^{5} A_g[i][j](n) \geq \delta \\ \text{normal, otherwise} \end{cases} \quad (14)$$

Where δ is a tunable threshold for all of the dimensional features. δ can be considered the threshold of the fusion cumulative sum of bucket of each row and each column of CRT-RS of $n^{th}$ time interval for each dimension or component of the statistics information of associated value of the key. The reason of defining this judge criterion is when DDoS flooding attacks occur, a dramatic increase in the number of TCP/UDP/ICMP data packets is an indicator of attacks. So it is set that $A_g[i][j](n)=1$ if $M_g[i][j](n) > \tau 1_g$ in Equation (12). Moreover, the scanning behavior of a host that sends out a number of similar data packets to many destination addresses will cause anomalies in dimensional features 4 and 5. It is set that $A_g[i][j](n)=0.5$ if $M_g[i][j](n) > \tau 2_g$ in Equation (13). Setting $A_g[i][j](n)=0.5$ when $g \in \{4,5\}$ is due to the dimensional features 4 and 5 are not so strong attack indicator as the dimensional features 1 to 3.

It should be noted that all of the buckets in CRT-RS, which is mapped from the key derived from the data packets originated from the abnormal source address or a group of the abnormal source addresses, have abnormal cumulative sum of current time interval, if there is a DDoS flooding attack. The buckets in each row and each column in the CRT-RS should be checked in traversal way rather than checking part of the buckets only, so as to avoid misjudgment in attack detection.

Notably, $M_g[i][j](n-1)$, $\widehat{u_g}[i][j](n-1)$ and $\widehat{\sigma_g}[i][j](n-1)$ is the results of the latest normal CRT-RS. That is to say, when an attack alarm is raised, these values will no longer update until the alarm is free. Therefore the method and device for network traffic analysis can setting the values of $M_g[i][j](n)$, $\widehat{u_g}[i][j](n)$ and $\widehat{\sigma_g}[i][j](n)$ as the values of $M_g[i][j](n-1)$, $\widehat{u_g}[i][j](n-1)$ and $\widehat{\sigma_g}[i][j](n-1)$ respectively at this situation, for each of the detected abnormal buckets at the position denoted by line i and column j. In addition, by adjusting the parameters in Equations (9)-(14), the method is capable of detecting some elaborate attacks.

DDoS flooding Attack Mitigation

After locating the abnormal buckets in each row of CRT-RS, the key which indicates the abnormal source address associated information can be reversely computed using the RECOVER function of CRT-RS. For example, the column number of abnormal bucket in each row of CRT-RS (the $c_i$ in Equation 7) is derived and can be used in Equation 8 to obtain the key indicating the source addresses associated information.

The abnormal source addresses associated information of the abnormal key calculated or the abnormal source address indicated by the abnormal source addresses associated information can be added to the blacklist. By looking up the source address of new arriving traffic data is in the blacklist or matches the abnormal source address indicated by the abnormal source address associated information in the blacklist, malicious traffic data verified by the blacklist is filtered.

Figure 4:
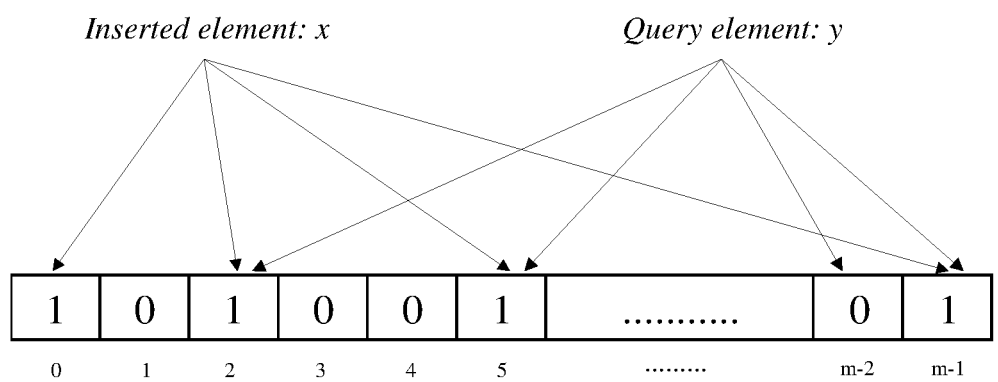
FIG. 4 illustrates a diagram of the Bloom filter according to an exemplary embodiment of present disclosure.

In an exemplary embodiment, a bloom filter can be used to quickly look up the blacklist. Bloom filter is a space-efficient data structure for set membership queries. It is composed of an array of m bits with all initial values of zero and K independent hash functions $h_i$ with a range of (0, 1, 2, ..., m−1), where i=(1, 2, ..., K), as the exemplary embodiment of the disclosure shown in FIG. 4. For each element x in a data set S, the bits at the buckets indicated by $h_i(x)$, i=(1, 2, ..., K), are set to 1. To query whether another element y belongs to the data set S, the bits at the buckets indicated by $h_i(y)$, i=(1, 2, ..., K), are checked. If all checked bits equal 1, the element y belongs to the data set S with high probability. As shown in FIG. 4, y does not belong to S because there exists one bit that equals 0. Although the bloom filter has a little false positive rate caused by conflicts of hash functions, the advantage of fast query and little space consumption of bloom filter still makes it become a popular data structure for set membership queries.

Other algorithms can also be used to look up the blacklist. These algorithms, for example, are binary search, block search, binary tree lookup, etc.

Figure 5:
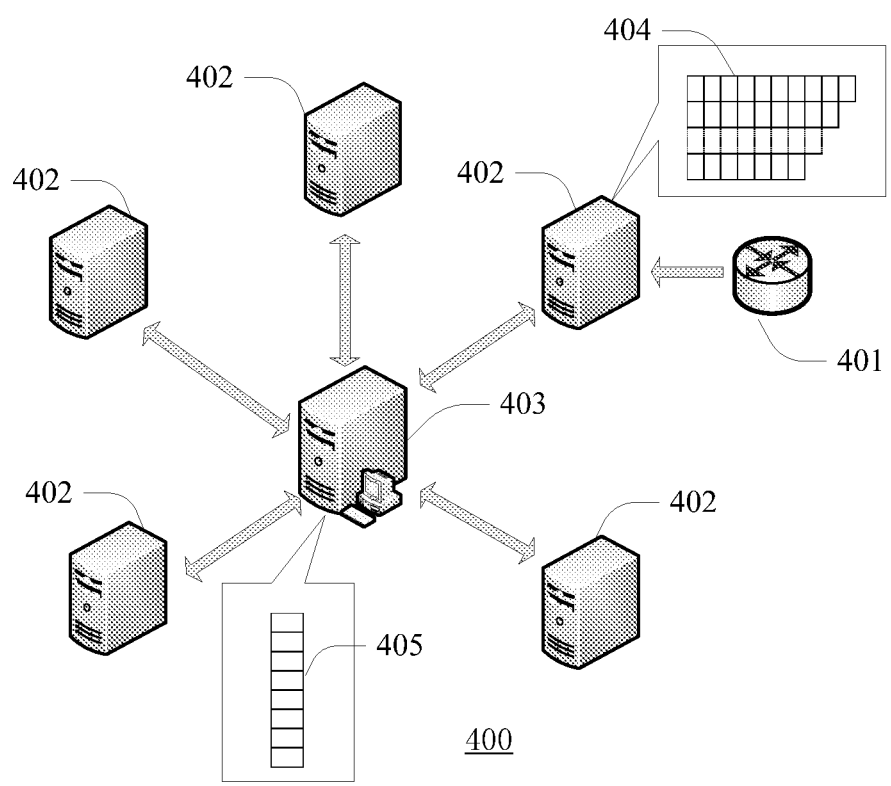
FIG. 5 illustrates a block diagram of another system architecture according to an exemplary embodiment of present disclosure.

FIG. 5 shows another system architecture of the method and device for network traffic analysis against DDoS flooding attack according to some embodiments of the disclosure. The system 400 for network traffic analysis comprises at least one node 402, where each of the nodes 402 performing the network traffic analysis against DDoS flooding attack respectively, and a central or supervisory node 403 performing network traffic analysis from an overall perspective. The supervisory node 403 may be selected from the nodes 402, then it also has the functions of obtaining the arriving traffic data 401 from network, recording the traffic data 401 into respective CRT-RS 404 and filtering the data packets from the abnormal source address based on a blacklist. The supervisory node 403 may also be an individual node which performs the functions of detecting the abnormal buckets in the CRT-RS and updating the blacklist only. For example, the supervisory node 403 gathers the CRT-RSs from each or part of the other nodes 402, and the combines the CRT-RSs into one CRT-RS based on the COMBINE function of CRT-RS. Then the supervisory node 403 detects the abnormal buckets in the combined CRT-RS by using MM-CUSUM algorithm above-mentioned and adds the abnormal source address or the abnormal source address associated information based on the key recovered from the abnormal buckets into the blacklist 405 of the supervisory node 403. The blacklist 405 can be sent to each or part of the nodes 402 to update the blacklists of these nodes 402 such that each of the nodes 402 can filter the abnormal data packets in the new arriving traffic data.

Figure 6:
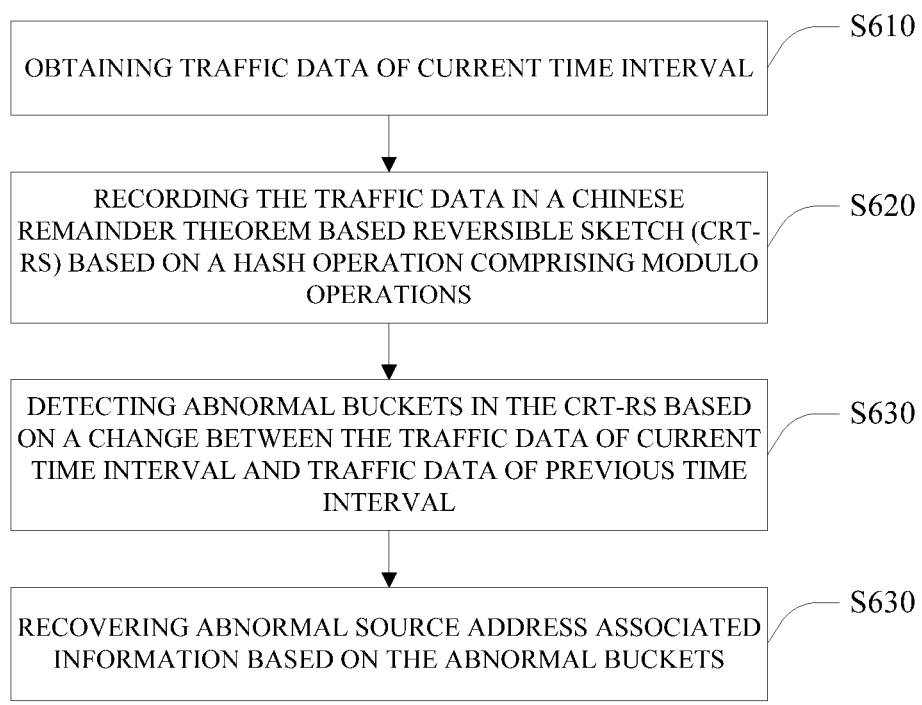
FIG. 6 illustrates a flow chart of a method for network traffic analysis according to an exemplary embodiment of present disclosure.

According to some embodiments of the disclosure, the method for network traffic analysis is provided. FIG. 6 shows the flow chart illustrating the exemplary steps of the method. The method for network traffic analysis comprises the steps of:

S610: obtaining traffic data of current time interval;

S620: recording the traffic data in a Chinese Remainder Theorem based Reversible Sketch (CRT-RS) based on a hash operation comprising Modulo operations, wherein the modulus of the Modulo operations are selected from the modulus in Chinese Remainder Theorem (CRT) as pairwise coprime integers and the CRT-RS includes a plurality of buckets;

S630: detecting abnormal buckets in the CRT-RS based on a change between the traffic data of current time interval and traffic data of previous time interval; and S640: recovering abnormal source address associated information based on the abnormal buckets.

In specific, the traffic data can comprise at least one data packets and be modeled as pairwise time of (key, value), thus step S620 further can comprise the step of deriving at least one pairwise item from the at least one data packet, wherein the pairwise item includes a key and an associated value of the key; and the step of recording the at least one pairwise item in the CRT-RS. In an exemplary embodiment, the key represents the source address associated information derived from the data packets and is at least one of the source address of the data packets, a combination of a source address and a port, a range of source addresses, and one or more fields in a header of data packet. The associated value of the key is the statistics information of the data packets corresponding to the key. The value, for example, is a vector comprising multiple components, each component of which is at least one of the number of TCP packets corresponding to the key, the number of UDP packets corresponding to the key, the number of ICMP packets corresponding to the key, the distribution of packet size corresponding to the key, and the distribution of destination address corresponding to the key.

The step of recording the at least one pairwise item in the CRT-RS may comprise mapping each of the at least one key to buckets in the CRT-RS by using hash operations, and adding the associated value of each of the at least one key to the values of corresponding buckets in the CRT-RS. The mapping can further comprise the step of performing a plurality of hash operations to each of the at least one key, wherein each of the hash operations at least comprises Modulo operations, and the modulus of Modulo operations can be selected from the modulus in Chinese Remainder Theorem (CRT) as pairwise coprime integers, and the step of determining the position of the bucket in the CRT-RS based on the serial number of the hash operation in the plurality of hash operations and the corresponding function value of the hash operation. The modulus of Modulo operations can be selected based on a number of source addresses indicated by the source address associated information. According to an exemplary embodiment, the position of the bucket is denoted by the serial number of the hash operation in the plurality of hash operations as the row number of the bucket and the corresponding function value of the hash operation as the column number of the bucket. The step of recording the traffic data in a Chinese Remainder Theorem based Reversible Sketch can further comprise combining the values of corresponding buckets in the CRT-RSs from a plurality of nodes obtaining and recording the traffic data.

The step 630 can further comprise the step of calculating a cumulative sum of the bucket of current time interval, for each bucket and each component of the associated value, based on the cumulative sum of the bucket of previous time interval and a change of the value of the bucket of current time interval. Further, the change of the value of the bucket of current time interval can be calculated based on the value of the bucket of current time interval, the mean value of the bucket of current time interval, and the standard deviation of the bucket of current time interval with a scaling factor. According to an exemplary embodiment, the mean value of the bucket of current time interval can be calculated based on the value of the bucket of current time interval and the mean value of the bucket of previous time interval, wherein at least one of the value of the bucket of current time interval and the mean value of the bucket of current time interval can be calculated with a weighting coefficient. The standard deviation of the bucket of current time interval can be calculated based on the value of the bucket of current time interval, the mean value of the bucket of current time interval, and the standard deviation of the bucket of previous time interval, wherein at least one of the value of the bucket of current time interval, the mean value of the bucket of current time interval, and the standard deviation of the bucket of previous time interval can be calculated with a weighting coefficient.

After the cumulative sum of the bucket is calculated, the method can further determine an abnormal bucket, if the cumulative sum of the bucket of current time interval for each component of the associated value exceeds a first threshold. The first threshold may be different for different components of the associated value. The method, for example, can further determine an abnormal bucket, if the sum of the cumulative sum of the bucket for all the components of the associated value exceeds a second threshold. If the abnormal buckets are detected, the method can further setting the values of the cumulative sum of the bucket of current time interval, the mean value of the bucket of current time interval, and the standard deviation of the bucket of current time interval, as the values of the cumulative sum of the bucket of previous time interval, the mean value of the bucket of previous time interval, and the standard deviation of the bucket of previous time interval respectively, for each of the detected abnormal buckets.

The step S640 can further comprise the step of recovering the key corresponding to the abnormal buckets by solving the hash operations based on the positions of the abnormal buckets; and the step of obtaining the abnormal source address associated information from the key. In an exemplary embodiment, the step 640 can comprise recording the positions of the buckets mapped corresponding to each of the at least one key in a mapping list, and recovering the key corresponding to the abnormal buckets by matching the positions of the abnormal buckets to the positions of buckets in the mapping list. Such recovering way will reduce the calculation amount.

Except for the DDoS flooding attack detection, the method for network traffic analysis can further comprising the steps for attack mitigation by using a blacklist storing abnormal source address associated information and a filter to filter the abnormal source address performing the attack.

Figure 7:
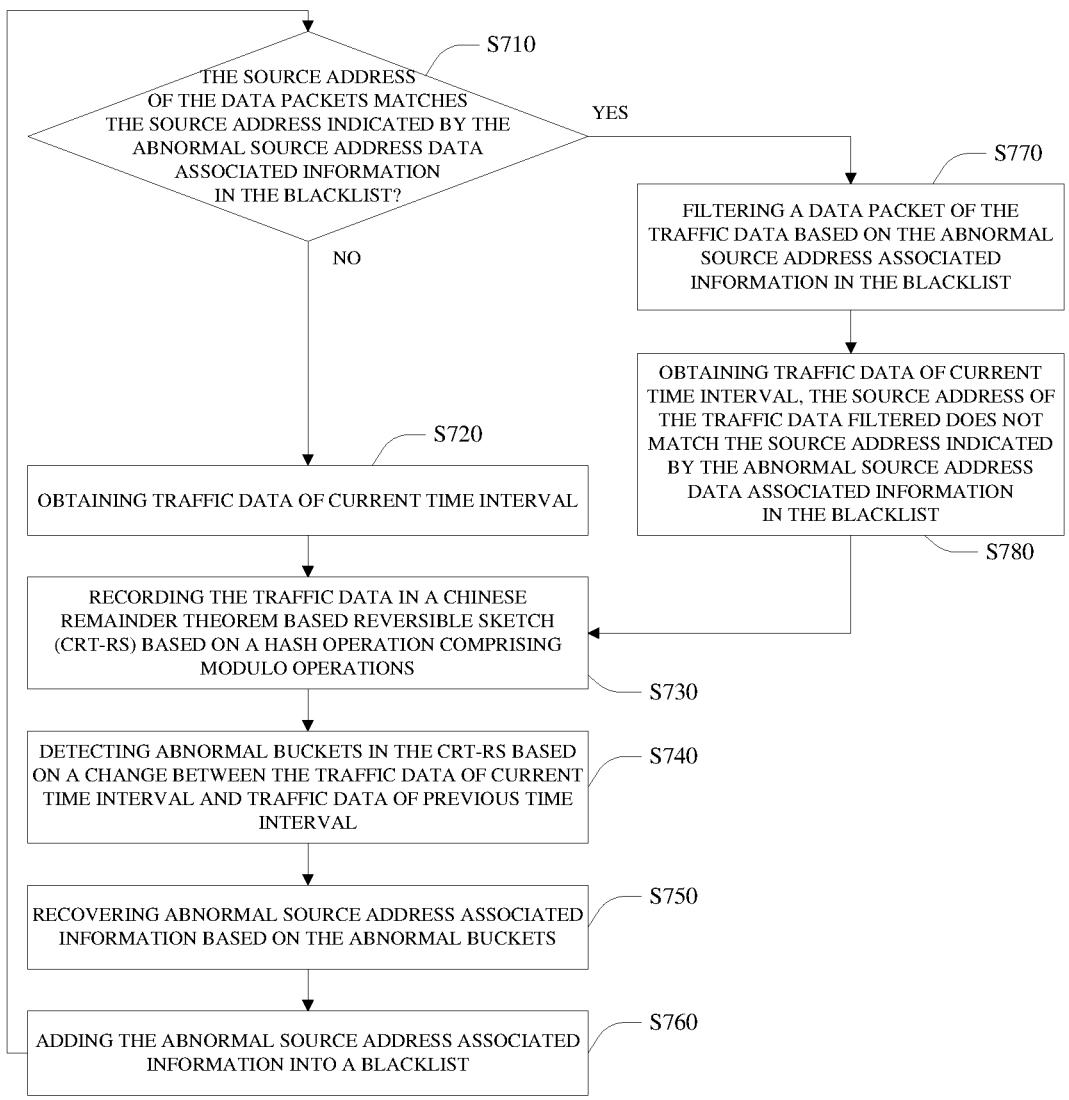
FIG. 7 illustrates a flow chart of a method for network traffic analysis according to another exemplary embodiment of present disclosure.

FIG. 7 illustrates a method for network traffic analysis according to an exemplary embodiment of the disclosure, especially for DDoS flooding attack mitigation. The method comprises the steps of:

S710: determining whether the source address of the data packets matches the source address indicated by the abnormal source address data associated information in the blacklist;

S720: obtaining traffic data of current time interval, if the result of step S710 is NO, wherein in the system initiation, the method can proceed to S720 directly since the blacklist is empty;

S730: recording the traffic data in a Chinese Remainder Theorem based Reversible Sketch (CRT-RS) based on a hash operation comprising Modulo operations, wherein the modulus of the Modulo operations are selected from the modulus in Chinese Remainder Theorem (CRT) as pairwise coprime integers and the CRT-RS includes a plurality of buckets;

S740: detecting abnormal buckets in the CRT-RS based on a change between the traffic data of current time interval and traffic data of previous time interval;

S750: recovering abnormal source address associated information based on the abnormal buckets;

S760: adding the abnormal source address associated information into a blacklist;

S770: filtering a data packet of the traffic data based on the abnormal source address associated information in the blacklist, if the result of step S710 is YES;

S780: obtaining traffic data of current time interval, the source address of the traffic data filtered does not match the source address indicated by the abnormal source address associated information in the blacklist.

For the system architecture comprising a plurality of nodes that perform the network traffic analysis, the method according to some embodiments of the disclosure can further comprise the step of combining the values of corresponding buckets in the CRT-RSs from the plurality of nodes obtaining and recording the traffic data, for example, during the process of DDoS flooding attack detection, and the step of adding the abnormal source address associated information into the blacklists of the plurality of nodes, for example, during the process of DDoS flooding attack mitigation, in comparison to the steps of method for network traffic analysis on a single node or device.

Figure 8:
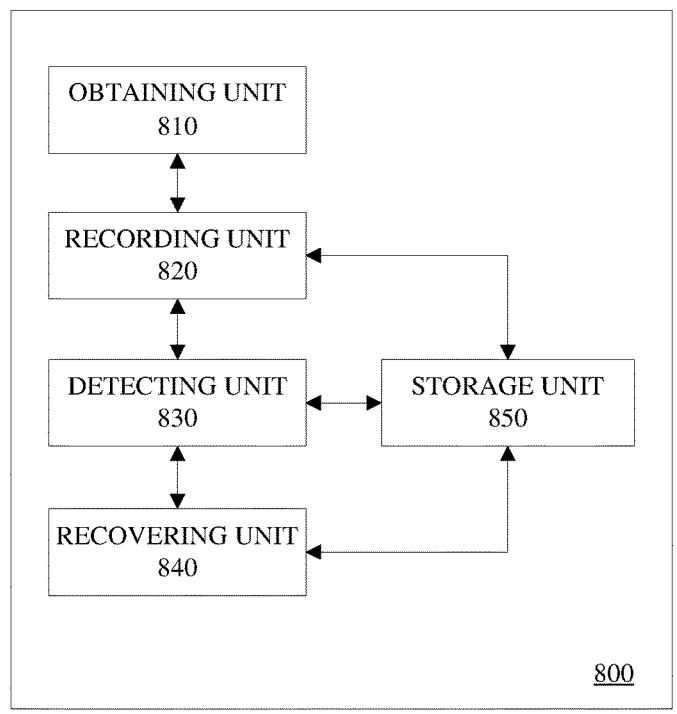
FIG. 8 illustrates a block diagram of the device for network traffic analysis according to an exemplary embodiment of the disclosure.

FIG. 8 shows the device for network traffic analysis according to an exemplary embodiment of the disclosure, especially for DDoS flooding attack detection. The device 800 can comprise an obtaining unit 810, a recording unit 820, a detecting unit 830, a recovering unit 840, and a storage unit 850. The obtaining unit 810 can be configured to obtain traffic data of current time interval. The recording unit 820 can be configured to record the traffic data in a Chinese Remainder Theorem based Reversible Sketch (CRT-RS) based on a hash operation comprising Modulo operations, wherein the modulus of the Modulo operations are selected from the modulus in Chinese Remainder Theorem (CRT) as pairwise coprime integers and the CRT-RS includes a plurality of buckets. Then the detecting unit 830 can be configured to detect abnormal buckets in the CRT-RS based on a change between the traffic data of current time interval and traffic data of previous time interval. The recovering unit 840 can be configured to recovering abnormal source address associated information based on the abnormal buckets. The data of CRT-RS is stored in the storage unit 850. Each of the units 810 to 840 can also comprise a memory unit to store the related information in the corresponding process of these units. In some embodiments, the related information or other data, such as the data relating to the MM-CUSUM algorithm can also be stored in the storage unit 850.

The traffic data can comprise at least one data packet. The obtaining unit can comprise a communication interface to receive the data packets of the traffic data from network. The recording unit 820 is further configured to derive at least one pairwise item from the at least one data packet and record the at least one pairwise item in the CRT-RS. The pairwise item can include a key and an associated value of the key. In specific, according to an exemplary embodiment, the key is source address associated information derived from the data packet and can be at least one of: a source address, a combination of a source address and a port, a range of source addresses, and one or more fields in a header of data packet.

The associated value of the key in the pairwise can be statistics information of the data packets corresponding to the key and comprise at least one of: the number of TCP packets corresponding to the key, the number of UDP packets corresponding to the key, the number of ICMP packets corresponding to the key, the distribution of packet size corresponding to the key, and the distribution of destination address corresponding to the key.

The recording unit 820, for example, can record the pairwise item into the CRT-RS by mapping each of the at least one key to buckets in the CRT-RS by using hash operations, and adding the associated value of each of the at least one key to the values of corresponding buckets in the CRT-RS. In the mapping process, the recording unit 820 can be further configured to perform a plurality of hash operations to each of the at least one key, wherein each of the hash operations at least comprises Modulo operations, and the modulus of Modulo operations are selected from the modulus in Chinese Remainder Theorem (CRT) as pairwise coprime integers, and determine the position of the bucket in the CRT-RS based on the serial number of the hash operation in the plurality of hash operations and the corresponding function value of the hash operation. The position of the bucket can be denoted by the serial number of the hash operation in the plurality of hash operations as the row number of the bucket and the corresponding function value of the hash operation as the column number of the bucket, for example. In the configuration of the hash functions, the modulus of Modulo operations in the hash operations can be arranged in ascending or descending order. With respect to the number of source address, the modulus of Modulo operations are selected based on a number of source addresses indicated by the source address associated information in some embodiments.

The detecting unit 830, in an exemplary embodiment, can be configured to perform a MM-CUSUM algorithm to perform the attack detection, such as, for each bucket and each component of the associated value, calculate a cumulative sum of the bucket of current time interval, based on the cumulative sum of the bucket of previous time interval and a change of the value of the bucket of current time interval, the change of the value of the bucket of current time interval is calculated based on the value of the bucket of current time interval, the mean value of the bucket of current time interval, and the standard deviation of the bucket of current time interval with a scaling factor. For example, the mean value of the bucket of current time interval can be calculated based on the value of the bucket of current time interval and the mean value of the bucket of previous time interval, wherein at least one of the value of the bucket of current time interval and the mean value of the bucket of previous time interval can be calculated with a weighting coefficient. The standard deviation of the bucket of current time interval then can be calculated based on the value of the bucket of current time interval, the mean value of the bucket of current time interval, and the standard deviation of the bucket of previous time interval, wherein at least one of the value of the bucket of current time interval, the mean value of the bucket of current time interval, and the standard deviation of the bucket of previous time interval can be calculated with a weighting coefficient.

After calculating the cumulative sum of the bucket, the detecting unit 830 can be further configured to determine an abnormal bucket, if the cumulative sum of the bucket of current time interval for each component of the associated value exceeds a first threshold. The first threshold is different for different components of the associated value in an exemplary embodiment. In addition, the abnormal bucket can be detected by determining whether the sum of the cumulative sum of the bucket for all the components of the associated value exceeds a second threshold. If an abnormal bucket is detected, the detecting unit 830 is further configured to setting the values of the cumulative sum of the bucket of current time interval, the mean value of the bucket of current time interval, and the standard deviation of the bucket of current time interval, as the values of the cumulative sum of the bucket of previous time interval, the mean value of the bucket of previous time interval, and the standard deviation of the bucket of previous time interval respectively, for each of the detected abnormal buckets.

In some embodiments of the present disclosure, during the recovering process, the recovering unit 840 can be configured to recovering the key corresponding to the abnormal buckets by solving the hash operations based on the positions of the abnormal buckets and obtain the abnormal source address associated information from the key. This recovering process can be performed by a simplifier manner, for example, the recovering unit 840 can be configured to record the positions of the buckets mapped corresponding to each of the at least one key in a mapping list, and recover the key corresponding to the abnormal buckets by matching the positions of the abnormal buckets to the positions of buckets in the mapping list. The mapping list can be stored in the storage unit 850.

Figure 9:
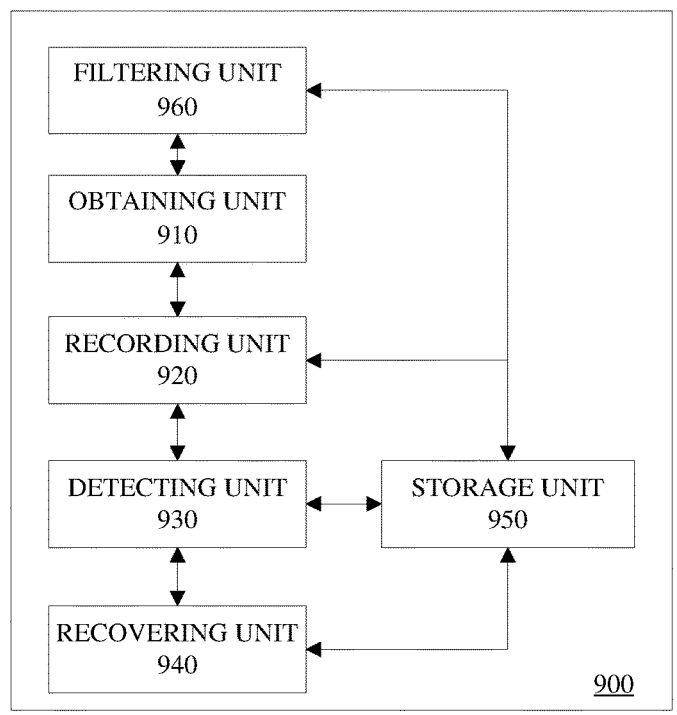
FIG. 9 illustrates a block diagram of the device for network traffic analysis according to another exemplary embodiment of the disclosure.

FIG. 9 shows the device for network traffic analysis according to an exemplary embodiment of the disclosure, especially for DDoS flooding attack mitigation. In comparison to the device 800 in FIG. 8, the device 900 in FIG. 9 can further comprise a filtering unit 960 configured to filter a data packet of the traffic data based on the abnormal source address associated information in the blacklist. Other units, such as the obtaining unit 910, the recording unit 920, the detecting unit 930, and the recovering unit 940, are configured to perform the similar functions as discussed above. The storage unit 950 may have additional function, such as, storing the blacklist for storing the abnormal source address associated information, in comparison to the storage unit 850 in FIG. 8.

Figure 10:
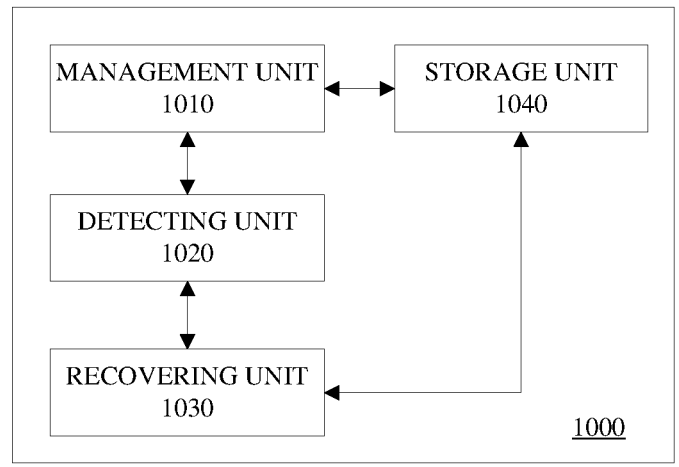
FIG. 10 illustrates a block diagram of the management device of the system for network traffic analysis according to an exemplary embodiment of the disclosure.

According to some embodiments of the disclosure, a system for network traffic analysis is provided. The system can comprise a plurality of the devices as shown in FIG. 8 or 9. In addition, the system can also comprise a management device 1000 as shown in FIG. 10. The management device 1000 comprises a management unit 1010, a detecting unit 1020, a recovering unit 1030, and a storage unit 1040, for example. The management unit 1010 can be configured to combine the values of corresponding buckets in the CRT-RSs from the plurality of devices of FIG. 8 or 9. Thus the management unit 1010 may comprise a communication interface to receive the CRT-RSs from other devices and send the updated blacklist to these devices. The detecting unit 1020 and the recovering unit 1030 can be configured to perform the similar functions as the detecting unit 930 and recovering unit 940 as shown in FIG. 9. Then the storage unit 1040 can store the combined CRT-RS and the blacklist. In comparison to the other devices, the management unit 1010 can be further configured to add the abnormal source address associated information into the blacklists of the plurality of devices to make the devices capable of carrying out attack mitigation, according to an exemplary embodiment of the disclosure.

The management device 1000 may also be selected from the devices which obtain and record the traffic data. Then the management device 1000 can comprise all the units as shown in FIG. 9 together with the management unit 1010 as shown in FIG. 10.

Based on the above-mentioned features, the method, device, and system for network traffic analysis according to the exemplary embodiment of the disclosure provide the at least one advantage as follows:

Suitable for dealing with large-scale network traffic: By using the sketch data structure to compress and fuse network traffic data into a compact and constant-size dataset, the solution according to an exemplary embodiment has the ability of dealing with large-scale traffic data in an efficient way by benefiting from the advance of the sketch data structure.

A novel reversible sketch: The method, device, and system for network traffic analysis according to some embodiments solve the problem of irreversibility in the traditional sketch by proposing a novel reversible sketch, called CRT-RS. CRT-RS utilizes the solution to congruence equations in Chinese Remainder Theorem to reversely compute the keys. Thus, the solutions can find abnormal source addresses and can further mitigate the malicious traffic data sourced from them.

Self-adaptive detection and protocol-independence: The method, device, and system for network traffic analysis according to some embodiments are self-adaptive and protocol-independent for detecting DDoS flooding attacks. First, the solutions use MM-CUSUM algorithm to monitor abrupt changes of network traffic over the time instead of prebuilding normal profile of network activities. This design can make attack detection adaptive to recent network traffic changes, not make judgement based on a previously established static profile. Moreover, the solutions are capable of detecting some elaborate attacks by adjusting the parameters in detection process. Such a self-adaptive property makes the solutions more flexible and robust to counter more network attacks. Second, the solutions make full use of basic attack characteristics of DDoS flooding attacks that cause a dramatic increase in the number of data packets. There are many protocols that can be exploited for launching DDoS flooding attacks. When and which type of DDoS flooding attacks will occur cannot be predicted. A protocol-independent method, device, and system are highly expected for evaluating the Internet security as a whole. In the solutions provided according to exemplary embodiments of the disclosure, a multi-dimensional change-point detection approach is used to find out the anomalies buckets in each row of CRT-RS. This design can support handling abnormal attacks under different protocols. The solutions provided are generic solutions that can combine different detection approaches based on one uniform reversible sketch data structure with high detection efficiency. Thus, it has high advantages over other existing detection approaches.

Extensibility: The designed sketch data structure can be extended to involve more dimensional features for DDoS flooding attack. It can be also extended to involve some specific dimensional features to detect other network attacks. Thus, the method, device, and system for network traffic analysis according to some embodiments of present disclosure can not only detect DDoS flooding attacks, but also be used to detect other attacks if the dimensional features used in a detection process can be integrated into the sketch data structure. From this point of view, the solutions can support synthesis attack detection in an adaptive, efficient and protocol-independent way.

Figure 11:
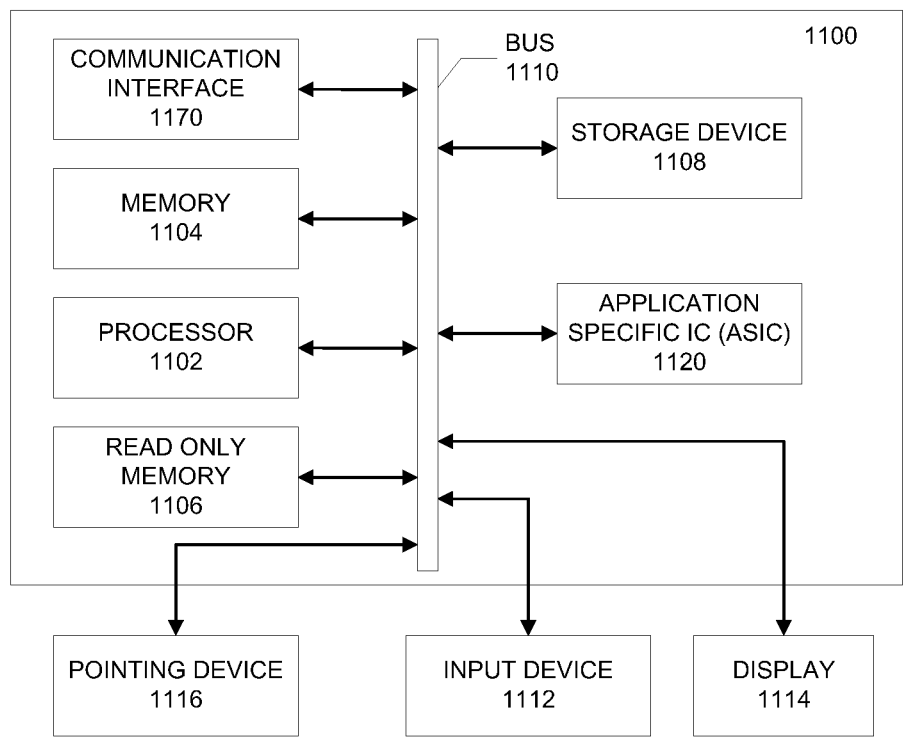
FIG. 11 illustrates a computer system upon which an exemplary embodiment of the disclosure can be implemented.

FIG. 11 illustrates a computer system 1100 upon which an exemplary embodiment of the disclosure can be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is designed and is programmed (e.g., via computer program code or instructions) for decentralized trust evaluation in a distributed network as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. Computer system 1100, or a portion thereof, constitutes a means for performing one or more steps of security and trust technologies and solutions in virtualized networks.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to the decentralized trust evaluation in a distributed network as described herein. The computer program code is a set of instructions or statements providing instructions for the operation of the processor and/or the computer system to perform specified functions. The code, for example, can be written in a computer programming language that is compiled into a native instruction set of the processor. The code can also be written directly using the native instruction set (e.g., a machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors can be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for decentralized trust evaluation in a distributed network as described herein. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for decentralized trust evaluation in a distributed network as described herein, is provided to the bus 710 for use by the processor from an external input device 1112, such as a keyboard containing alphanumeric keys operated by a human user, or a sensor. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link that is connected to a local network to which a variety of external devices with their own processors are connected. For example, communication interface 1170 can be a parallel port or a serial port or a universal serial bus (USB) port on a personal computer. In some embodiments, communications interface 1170 is an integrated service digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 can be a local area network (LAN) card to provide a data communication connection to a compatible LAN, such as Ethernet. Wireless links can also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communication interface 1170 includes a radio band electromagnetic transmitter and receiver called a radio transceiver. In certain embodiments, the communication interface 1170 enables connection to virtualized networks for decentralized trust evaluation in a distributed network as described herein.

The term "computer-readable medium" as used herein refers to any medium that participates in providing information to processor 1102, including instructions for execution. Such a medium can take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

At least some embodiments of the disclosure are related to the use of computer system 71100 for implementing some or all of the techniques described herein. According to one embodiment of the disclosure, those techniques are performed by computer system 1100 in response to processor 1102 executing one or more sequences of one or more processor instructions contained in memory 1104. Such instructions, also called computer instructions, software and program code, can be read into memory 1104 from another computer-readable medium such as storage device 1108 or network link. Execution of the sequences of instructions contained in memory 1104 causes processor 1102 to perform one or more of the method steps described herein. In alternative embodiments, hardware, such as ASIC 1120, can be used in place of or in combination with software to implement the invention. Thus, embodiments of the invention are not limited to any specific combination of hardware and software, unless otherwise explicitly stated herein.

The signals transmitted over network link and other networks through communications interface 1170, carry information to and from computer system 1100. Computer system 1100 can send and receive information, including program code, through the networks, through communications interface 1170. The received code can be executed by processor 1102 as it is received, or can be stored in memory 1104 or in storage device 1108 or other non-volatile storage for later execution, or both. In this manner, computer system 1100 can obtain application program code in the form of signals on a carrier wave.

Figure 12:
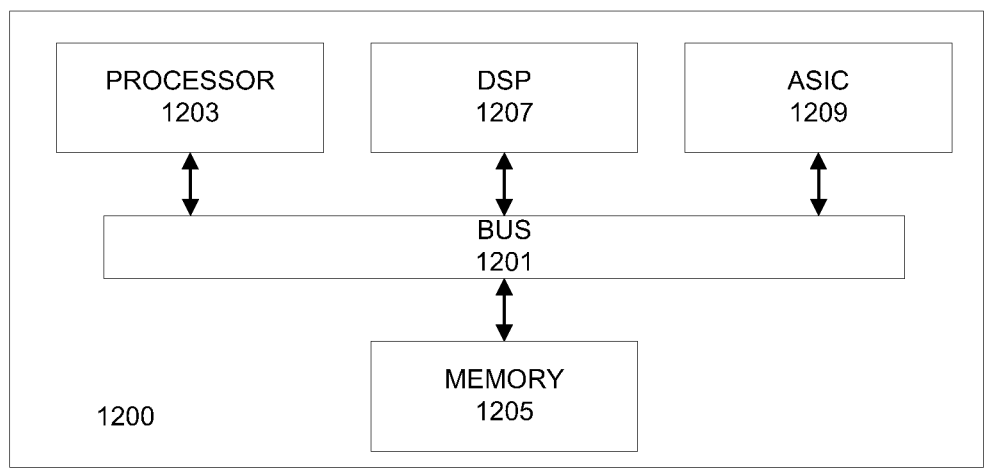
FIG. 12 illustrates a chip set that can be used to implement an exemplary embodiment of the disclosure.

FIG. 12 illustrates a computer system 1200 upon which an embodiment of the disclosure can be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is designed and is programmed (e.g., via computer program code or instructions) for decentralized trust evaluation in a distributed network as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. Computer system 1100, or a portion thereof, constitutes a means for performing one or more steps of security and trust technologies and solutions in virtualized networks.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to the decentralized trust evaluation in a distributed network as described herein. The computer program code is a set of instructions or statements providing instructions for the operation of the processor and/or the computer system to perform specified functions. The code, for example, can be written in a computer programming language that is compiled into a native instruction set of the processor. The code can also be written directly using the native instruction set (e.g., a machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors can be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for decentralized trust evaluation in a distributed network as described herein. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for decentralized trust evaluation in a distributed network as described herein, is provided to the bus 710 for use by the processor from an external input device 1112, such as a keyboard containing alphanumeric keys operated by a human user, or a sensor. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link that is connected to a local network to which a variety of external devices with their own processors are connected. For example, communication interface 1170 can be a parallel port or a serial port or a universal serial bus (USB) port on a personal computer. In some embodiments, communications interface 1170 is an integrated service digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 can be a local area network (LAN) card to provide a data communication connection to a compatible LAN, such as Ethernet.

Wireless links can also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communication interface 1170 includes a radio band electromagnetic transmitter and receiver called a radio transceiver. In certain embodiments, the communication interface 1170 enables connection to virtualized networks for decentralized trust evaluation in a distributed network as described herein.

The term "computer-readable medium" as used herein refers to any medium that participates in providing information to processor 1102, including instructions for execution. Such a medium can take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

At least some embodiments of the disclosure are related to the use of computer system 71100 for implementing some or all of the techniques described herein. According to one embodiment of the disclosure, those techniques are performed by computer system 1100 in response to processor 1102 executing one or more sequences of one or more processor instructions contained in memory 1104. Such instructions, also called computer instructions, software and program code, can be read into memory 1104 from another computer-readable medium such as storage device 1108 or network link. Execution of the sequences of instructions contained in memory 1104 causes processor 1102 to perform one or more of the method steps described herein. In alternative embodiments, hardware, such as ASIC 1120, can be used in place of or in combination with software to implement the invention. Thus, embodiments of the invention are not limited to any specific combination of hardware and software, unless otherwise explicitly stated herein.

The signals transmitted over network link and other networks through communications interface 1170, carry information to and from computer system 1100. Computer system 1100 can send and receive information, including program code, through the networks, through communications interface 1170. The received code can be executed by processor 1102 as it is received, or can be stored in memory 1104 or in storage device 1108 or other non-volatile storage for later execution, or both. In this manner, computer system 1100 can obtain application program code in the form of signals on a carrier wave.

FIG. 12 illustrates a chip set 1200 upon which an embodiment of the disclosure can be implemented. Chip set 1200 is programmed to decentralized trust evaluation in a distributed network as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of performing multiple forms of communication in the same communication session.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 can include one or more processing cores with each core configured to perform independently. A multi-core processor enables multiprocessing within a single physical package. Examples of a multi-core processor include two, four, eight, or greater numbers of processing cores. Alternatively, or in addition, the processor 803 can include one or more microprocessors configured in tandem via the bus 801 to enable independent execution of instructions, pipelining, and multithreading. The processor 1203 can also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to perform multiple forms of communication in the same communication session. The memory 1205 also stores the data associated with or generated by the execution of the inventive steps.

The present disclosure includes any novel feature or combination of features disclosed herein either explicitly or any generalization thereof. Various modifications and adaptations to the foregoing exemplary embodiments of this disclosure can become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method for network traffic analysis to at least identify sources of malicious attacks on security of a network, comprising:
obtaining traffic data of current time interval and deriving at least one pairwise item from the traffic data, the pairwise item comprising a key and a value;
recording the at least one pairwise item in a Chinese Remainder Theorem based Reversible Sketch (CRT-RS) based on a hash operation comprising Modulo operations, wherein a modulus of the Modulo operations is selected from the modulus in Chinese Remainder Theorem (CRT) as pairwise coprime integers and the CRT-RS includes a plurality of buckets, wherein for each pairwise item a bucket is chosen based on a result of the hash operation and the value accumulated into the chosen bucket;
detecting abnormal buckets in the CRT-RS based on a change between the traffic data of the current time interval and traffic data of previous time interval; and
recovering abnormal source address associated information based on the abnormal buckets, wherein the abnormal source address is a source of malicious traffic data,
wherein the value in each of the at least one pairwise item comprises plural components, and wherein the detecting of the abnormal buckets comprises detecting an abnormal bucket as a response to each component of the value accumulated into the abnormal bucket exceeding a threshold condition.

2. An apparatus to at least identify sources of malicious attacks on security of a network, the apparatus comprising:
at least one processing core,
at least one memory including computer program code,
the at least one memory and the computer program code being configured to, with the at least one processing core, cause the apparatus at least to:
obtain traffic data of current time interval and derive at least one pairwise item from the traffic data, the pairwise item comprising a key and a value;
record the at least one pairwise item in a Chinese Remainder Theorem based Reversible Sketch (CRT-RS) based on a hash operation comprising Modulo operations, wherein a modulus of the Modulo operations is selected from the modulus in Chinese Remainder Theorem (CRT) as pairwise coprime integers and the CRT-RS includes a plurality of buckets, wherein for each pairwise item a bucket is chosen based on a result of the hash operation and the value accumulated into the chosen bucket;
detect abnormal buckets in the CRT-RS based on a change between the traffic data of the current time interval and traffic data of previous time interval;
recover abnormal source address associated information based on the abnormal buckets wherein the abnormal source address is a source of malicious traffic data; and
store the CRT-RS,
wherein the value in each of the at least one pairwise item comprises plural components, and wherein the apparatus is configured to perform the detecting of the abnormal buckets by detecting an abnormal bucket as a response to each component of the value accumulated into the abnormal bucket exceeding a threshold condition.

3. The apparatus according to claim 2, wherein, the key is source address associated information derived from the data packet.

4. The apparatus according to claim 2, wherein, the associated value of the key comprises statistical information of the data packets corresponding to the key.

5. The apparatus according to claim 4, wherein, the components of values comprise at least two components of:
a number of Transmission Control Protocol packets corresponding to the key;
a number of User Datagram Protocol packets corresponding to the key;
a number of Internet Control Message Protocol packets corresponding to the key;
a distribution of packet size corresponding to the key; or
a distribution of destination address corresponding to the key.

6. The apparatus according to claim 2, is further configured to:
perform a plurality of hash operations to each of the at least one key, wherein each of the hash operations at least comprises Modulo operations, and the modulus of Modulo operations is selected from the modulus in the Chinese Remainder Theorem (CRT) as pairwise coprime integers;
determine the position of the bucket in the CRT-RS based on a serial number of the hash operation in the plurality of hash operations and the corresponding function value of the hash operation.

7. The apparatus according to claim 6, wherein, the serial number of the hash operation in the plurality of the hash operations denotes a row number of the bucket and the corresponding function value of the hash operation denotes a column number of the bucket.

8. The apparatus according to claim 6, wherein, the modulus of the Modulo operations is selected based on a number of source addresses indicated by the source address associated information.

9. The apparatus according to claim 2, is further configured to:
for each bucket and each component of associated value, calculate a cumulative sum of buckets of the current time interval, based on the cumulative sum of buckets of the previous time interval and a change of the value of the bucket of the current time interval, the change of the value of the bucket of the current time interval is calculated based on the value of the bucket of the current time interval, mean value of the buckets of the current time interval, and standard deviation of the buckets of the current time interval with a scaling factor.

10. The apparatus according to claim 9, wherein, the mean value of the bucket of the current time interval is calculated based on the value of the bucket of the current time interval and the mean value of the bucket of the previous time interval, wherein at least one of the value of the bucket of the current time interval and the mean value of the bucket of the previous time interval is calculated with a weighting coefficient.

11. The apparatus according to claim 10, wherein, the standard deviation of the bucket of the current time interval is calculated based on the value of the bucket of the current time interval, the mean value of the bucket of the current time interval, and the standard deviation of the bucket of the previous time interval, wherein at least one of the value of the bucket of the current time interval, the mean value of the bucket of the current time interval, and the standard deviation of the bucket of the previous time interval is calculated with a weighting coefficient.

12. The apparatus according to claim 9, is further configured to:
determine an abnormal bucket, if the cumulative sum of the bucket of the current time interval for each component of the associated value exceeds a first threshold.

13. The apparatus according to claim 12, wherein, the first threshold is different for different components of the associated value.

14. The apparatus according to claim 12, is further configured to:
determine an abnormal bucket, if the sum of the cumulative sum of the bucket for all the components of the associated value exceeds a second threshold.

15. The apparatus according to claim 9, is further configured to:
set the values of the cumulative sum of the bucket of the current time interval, the mean value of the bucket of the current time interval, and the standard deviation of the bucket of the current time interval, as values of the cumulative sum of the bucket of the previous time interval, the mean value of the bucket of the previous time interval, and the standard deviation of the bucket of the previous time interval respectively, for each of the detected abnormal buckets.

16. The apparatus according to claim 2, is further configured to:
recover the key corresponding to the abnormal buckets by solving the hash operations based on positions of the abnormal buckets; and
obtain the abnormal source address associated information from the key.

17. The apparatus according to claim 2, is further configured to:
store a blacklist configured to store the abnormal source address associated information;
filter the traffic data based on the abnormal source address associated information in the blacklist by blocking a data packet belonging to the abnormal source address.

18. A method for network traffic analysis to at least identify sources of malicious attacks on security of a network, comprising:
obtaining traffic data of current time interval and deriving at least one pairwise item from the traffic data, the pairwise item comprising a key and a value;
recording the at least one pairwise item in a Chinese Remainder Theorem based Reversible Sketch (CRT-RS) based on a hash operation comprising Modulo operations, wherein a modulus of the Modulo operations is selected from the modulus in Chinese Remainder Theorem (CRT) as pairwise coprime integers and the CRT-RS includes a plurality of buckets, wherein for each pairwise item a bucket is chosen based on a result of the hash operation and the value accumulated into the chosen bucket;
detecting abnormal buckets in the CRT-RS based on a change between the traffic data of the current time interval and traffic data of previous time interval;
recovering abnormal source address associated information based on the abnormal buckets, wherein the abnormal source address is a source of malicious traffic data,
storing a blacklist configured to store the abnormal source address associated information; and,
filtering the traffic data based on the abnormal source address associated information in the blacklist by blocking a data packet belonging to the abnormal source address and otherwise forwarding data packets,
wherein the value in each of the at least one pairwise item comprises plural components, and wherein the detecting of the abnormal buckets comprises detecting an abnormal bucket as a response to each component of the value accumulated into the abnormal bucket exceeding a threshold condition.

19. An apparatus to at least identify sources of malicious attacks on security of a network, the apparatus comprising:
at least one processing core,
at least one memory including computer program code,
the at least one memory and the computer program code being configured to, with the at least one processing core, cause the apparatus at least to:
obtain traffic data of current time interval and derive at least one pairwise item from the traffic data, the pairwise item comprising a key and a value;
record the at least one pairwise item in a Chinese Remainder Theorem based Reversible Sketch (CRT-RS) based on a hash operation comprising Modulo operations, wherein a modulus of the Modulo operations is selected from the modulus in Chinese Remainder Theorem (CRT) as pairwise coprime integers and the CRT-RS includes a plurality of buckets, wherein for each pairwise item a bucket is chosen based on a result of the hash operation and the value accumulated into the chosen bucket;
detect abnormal buckets in the CRT-RS based on a change between the traffic data of the current time interval and traffic data of previous time interval;
recover abnormal source address associated information based on the abnormal buckets wherein the abnormal source address is a source of malicious traffic data;
store the CRT-RS;
store a blacklist configured to store the abnormal source address associated information; and
filter the traffic data based on the abnormal source address associated information in the blacklist by blocking a data packet belonging to the abnormal source address and otherwise forwarding data packets,
wherein the value in each of the at least one pairwise item comprises plural components, and wherein the apparatus is configured to perform the detecting of the abnormal buckets by detecting an abnormal bucket as a response to each component of the value accumulated into the abnormal bucket exceeding a threshold condition.

* * * * *